US010778720B2

(12) United States Patent
Lee et al.

(10) Patent No.: US 10,778,720 B2
(45) Date of Patent: Sep. 15, 2020

(54) SYSTEM AND METHOD FOR SECURITY HEALTH MONITORING AND ATTESTATION OF VIRTUAL MACHINES IN CLOUD COMPUTING SYSTEMS

(71) Applicant: Teleputers, LLC, Princeton, NJ (US)

(72) Inventors: Ruby B. Lee, Princeton, NJ (US); Tianwei Zhang, Princeton, NJ (US)

(73) Assignee: Teleputers, LLC, Princeton, NJ (US)

( * ) Notice: Subject to any disclaimer, the term of this patent is extended or adjusted under 35 U.S.C. 154(b) by 188 days.

(21) Appl. No.: 15/179,734

(22) Filed: Jun. 10, 2016

(65) Prior Publication Data

US 2016/0366185 A1    Dec. 15, 2016

Related U.S. Application Data

(60) Provisional application No. 62/175,030, filed on Jun. 12, 2015.

(51) Int. Cl.
*H04L 29/08* (2006.01)
*H04L 29/06* (2006.01)
*G06F 9/455* (2018.01)
*H04L 9/32* (2006.01)

(52) U.S. Cl.
CPC .......... *H04L 63/20* (2013.01); *G06F 9/45558* (2013.01); *H04L 9/3234* (2013.01); *H04L 9/3236* (2013.01); *H04L 9/3247* (2013.01); *H04L 63/1416* (2013.01); *H04L 63/1433* (2013.01); *H04L 63/1441* (2013.01); *G06F 2009/4557* (2013.01); *G06F 2009/45587* (2013.01); *G06F 2009/45591* (2013.01); *G06F 2009/45595* (2013.01); *H04L 63/12* (2013.01)

(58) Field of Classification Search
CPC .............................. H04L 63/20; H04L 9/3234
USPC ......................................................... 713/155
See application file for complete search history.

(56) References Cited

U.S. PATENT DOCUMENTS

2007/0271360 A1* 11/2007 Sahita ................... G06F 21/577
709/223
2013/0198797 A1* 8/2013 Raghuram .............. G06F 21/57
726/1

OTHER PUBLICATIONS

Schiffman, et al., "Seeding Clouds with Trust Anchors," in Proceedings of the ACM Workshop on Cloud Computing Security Workshop, 2010 (6 pages).
Santos, et al., "Policysealed Data: A New Abstraction for Building Trusted Cloud Services," in Proceedings of the Conference on USENIX Security Symposium, 2012 (14 pages).
(Continued)

*Primary Examiner* — Anthony D Brown
(74) *Attorney, Agent, or Firm* — McCarter & English, LLP

(57) ABSTRACT

A system for security health monitoring and attestation of virtual machines in cloud computing systems is provided. The system includes a cloud server having a virtual machine and a hypervisor. The cloud server collects security measurement information and signs and hashes the security measurement information using a cryptography engine. The system also includes an attestation server for receiving the hashed security measurement information from the cloud server. The attestation server also verifies the signature and hash values, and interprets the security measurement information. The attestation server generates an attestation report based on the verification and interpretation of the security measurement information.

48 Claims, 13 Drawing Sheets

(56) References Cited

OTHER PUBLICATIONS

Sadeghi, et al., "Property-Based Attestation for Computing Platforms: Caring about Properties, Not Mechanisms," in Proceedings of the Workshop on New Security Paradigms, 2004 (11 pages).
Jamkhedkar, et al., "A Framework for Realizing Security on Demand in Cloud Computing," in Proceedings of the IEEE onference on Cloud Computing Technology and Science, 2013 (8 pages).

\* cited by examiner

SYSTEM AND METHOD FOR SECURITY HEALTH MONITORING AND ATTESTATION OF VIRTUAL MACHINES IN CLOUD COMPUTING SYSTEMS

RELATED APPLICATIONS

The present application claims the benefit of U.S. Provisional Application Ser. No. 62/175,030 filed on Jun. 12, 2015, the entire disclosure of which is expressly incorporated herein by reference.

BACKGROUND

Field of the Disclosure

The present disclosure relates generally to systems for improving the security of virtual machines in cloud computing systems. More specifically, the present disclosure relates to a system and method for security health monitoring and attestation of virtual machines in cloud computing systems.

Related Art

In an Infrastructure as a Service ("IaaS") computing environment, a customer can request to launch a Virtual Machine ("VM") in the cloud system. The cloud provider places the VM in a virtualized cloud server, and allocates a specified amount of physical resources (CPU, memory, disk, networking, etc.) to the VM. The customer is granted remote access to the VM. During the VM's lifetime, the customer may want to know if the VM has good security health. A healthy VM is one that satisfies the security properties the customer requested for a particular VM. For example, if the customer stores sensitive data in the cloud server's storage, a healthy VM enforces confidentiality and protection of the data from other VMs, or from physical attackers. For another customer with time-critical service needs, a healthy VM may mean that resources that have been contracted for in the Service Level Agreement (SLA) are always available to the VM.

In cloud computing, different customers can share the same cloud server, as co-tenants or co-resident VMs. These VMs may belong to competitors, spies, or malicious attackers. The security health of a VM should take into account the other co-resident VMs (called "outside-VM" vulnerabilities), not just the attacks from within the VM ("inside-VM" vulnerabilities such as malware, guest OS root kits, etc.). Outside-VM vulnerabilities from "bad neighbor" VMs can steal critical information through side-channel attacks or covert channel attacks, which can compromise the VM's confidentiality health. Resource contention for shared resources between different VMs on the same server enable malicious VMs to perform Denial of Service attacks which can compromise the victim VM's availability health. Large cloud management software, including the hypervisor, can also have bugs, which can be exploited to compromise a VM's security health. Hence, a VM's security health depends on not only the activities inside the VM, but also the VM's interactions with the environment.

The prior art solutions on inside-VM threats proposed Virtual Machine Introspection ("VMI") techniques. This can provide the service of VM health monitoring at the hypervisor level. Since the hypervisor manages the VMs and runs below the VMs, a hypervisor health monitor is outside the VM, it is able to detect the existence of malicious or untrusted entities inside the VM, while being isolated, and thus protected, from the VM. Since the introduction of the VMI technique and a Livewire intrusion detection system, many VMI-based architectures have been designed to monitor the inside-VM health. These architectures detect abnormal behaviors inside the VM, but do not consider the threats from co-resident VMs or other outside-VM entities. For instance, a VMI tool may be able to detect confidentiality breaches caused by malicious programs residing in the target VM, but it cannot detect attacks to the VM's environment that indirectly affect the VM's security health. The prior art systems do not address how to allow the remote customer to use monitoring services based on a set of security requirements.

Prior art solutions also fail to provide adequately for remote attestation of security health properties in VM environments. Remote attestation has been defined to enable remote customers to test the integrity of a targeted system based on the integrity hash measurements supplied by that system, i.e., binary attestation. Trusted Platform Module ("TPM") based attestation can verify the platform integrity of a remote server when it booted up. The targeted server uses the TPM to calculate the binary hash values of the platform configurations and sends them to the customer. The customer compares these values with reference configurations, possibly via a trusted third party appraiser, and determines whether the state of the platform is in the unmodified (good) state. In the context of virtualization platforms, the virtual Trusted Platform Module ("vTPM") was designed to provide the same usage model and services to the VMs as the hardware TPM. Accordingly, remote attestation can be carried out directly between the customers and their virtual machines by the vTPM instances. vTPM-based attestation raises some problems for VM monitoring: it cannot monitor the security conditions of the VM's environment. Furthermore, the monitoring tool resides in the guest OS, so it needs modification of the guest OS, and commodity OSes are also highly susceptible to attacks. As will be explained in greater detail below, providing adequately for remote attestation of security health properties in VM environments is introduced in the system of the present disclosure to overcome the above-mentioned problems in the prior art.

Prior work also attempt to teach the concept of property-based attestation to attest to different properties of a system. However, the specification, implementation and interpretation of properties to be attested remain as challenging, open problems. This makes it very difficult for computer architects to convert the concept of property-based attestation into real architectures. It is therefore desirable to provide a system to monitor host machines and VMs to see if different security properties are being enforced or violated, thus providing property-based attestation in cloud computing systems. It is also desirable to provide an infrastructure for property-based attestation of arbitrary security properties, not just integrity. Examples of security properties include degraded availability and loss of confidentiality through covert channels or side channels, or other explicit or implicit information leakage mechanisms. It also includes availability of resources when needed, provenance of data, audit logs, privacy-preserving operations, etc. It is further desirable to provide attestation not only on boot up and VM initiation, but also during VM runtime and migration. Finally, it is desirable to provide a system for ongoing periodic attestation for a VM's security health and to introduce a trusted property interpretation and certification server to transform the platform's security measurements into properties and vice versa, and determine if the platform's condition satisfies a given set of properties. Such a property interpretation and certification server (which we also call an attestation server) can also interpret measurements from multiple VMs and multiple servers to determine broader security health properties Monitoring the VMs' security health poses a series of challenges in a cloud system. First, the customer's limited privileges prevent the customer from collecting comprehensive security measurements to monitor the VM's health securely. The customer only has access to the VM, but not to the host server. For inside-VM vulnerabilities, once the VM's operating system (OS) in the VM is compromised by an attacker, the customer may not get correct measurements. For outside-VM vulnerabilities, the customer cannot collect information about the co-resident VMs, hypervisor, etc. Second, the customer's desired security requirements are expressed in terms of the high-level security requirements of a VM, but the security measurements that can be collected efficiently usually involve low-level measurements of the physical server, the hypervisor and other entities related to this VM. This creates a semantic gap between what the customer wants to monitor and the type of measurements that can be collected. Third, the VMs go through different lifecycle stages and may migrate to different host servers. Fourth, there are numerous entities between the customers and where the VM performs operations, in typical cloud computing environments. It is important to collect, filter and interpret the monitored information securely, in order to attest, i.e., pass on to the customer in an unforgeable way, only the requested information.

As will be explained in greater detail below, the present application will overcome the problems in the prior art systems in at least the following ways by (1) providing a flexible architecture to monitor the security health of VMs on cloud servers over the VMs' lifecycle, (2) providing a framework for monitoring different aspects of security health, (3) bridging the semantic gap between security properties that the customer requests and actual security measurements of a VM, (4) providing different security monitoring and attestation activities during a VM's lifecycle, and (5) providing automatic remediation responses to failing security health indicated by negative attestation results.

SUMMARY

A system for security health monitoring and attestation of virtual machines in cloud computing systems is provided. The system includes a cloud server having multiple virtual machines managed by a hypervisor (also called a Virtual Machine Monitor, VMM). The cloud server collects security measurement information and hashes and signs the security measurement information using a cryptography engine. The system also includes an attestation server for receiving the hashed security measurement information from the cloud server. The attestation server also verifies the signature and hash values, and interprets the security measurement information. The attestation server receives security measurements from multiple cloud servers and multiple virtual machines. The attestation server generates an attestation report based on the verification and interpretation of the security measurement information.

A method for security health monitoring and attestation of virtual machines in cloud computing systems is provided. The method includes the step of providing a cloud server including a virtual machine and a hypervisor, the cloud server collecting security measurement information and signing and hashing the security measurement information using a cryptography engine. The method also includes the step of providing an attestation server for receiving the hashed security measurement information from the cloud server, the attestation server verifying the signature and hash values, and interpreting the security measurement information. The attestation server also interprets the security measurements from multiple cloud servers and multiple VMs, to determine whether certain security properties are likely to be held or not. The method further includes the step of generating an attestation report by the attestation server based on the verification and interpretation of the security measurement information.

A cloud server for security health monitoring and attestation of virtual machines in cloud computing systems is also provided. The cloud server includes a software entity to be protected (e.g., virtual machine or process), a system software layer that manages the software entities and assigns resources to them (e.g., hypervisor or operating system), a plurality of network interface controllers, a plurality of random access memories, a plurality of central processing units, and a plurality of cache memories. The cloud server further includes a monitor module for monitoring and gathering security measurement information and a trust module for generating new keys and nonces, and for hashing and signing, and optionally encrypting, the security measurement information using cryptography operations.

A method for maintaining the security of virtual machines in cloud computing systems is also provided. The method includes the step of providing a software entity to be protected (e.g., a virtual machine or a process), a system software layer that manages the software entities and assigns resources to them (e.g., a hypervisor or an operating system) a plurality of network interface controllers, a plurality of random access memories, a plurality of central processing units, and a plurality of cache memories. The method also includes the step of providing a monitor module for monitoring and gathering security measurement information and a trust module for hashing and signing the security measurement information using cryptography operations.

A system for security health monitoring and attestation of virtual machines in cloud computing systems is further provided. The system includes a cloud server having multiple software entities to be managed and protected by a system software. The cloud server collects security measurement information and interprets these as properties that show the security health of the software entities. The cloud server hashes and signs the security measurement information using a cryptography engine. The system can also include an attestation server for receiving the hashed security measurement information from the cloud server. The attestation server also verifies the signature and hash values, and interprets the security measurement information. The attestation server receives security measurements form multiple cloud servers and multiple software entities to be protected. The attestation server generates an attestation report based on the verification and interpretation of the security measurement information.

A method for security health monitoring and attestation of virtual machines in cloud computing systems is provided. The method includes the step of providing a cloud server including a software entity to be protected and a system software that protects these entities, the cloud server collecting security measurement information and signing and hashing the security measurement information using a cryptography engine. The method also includes the step of providing an attestation server for receiving the hashed security measurement information from the cloud server, the attestation server verifying the signature and hash values, and interpreting the security measurement information. The attestation server also interprets the security measurements from multiple cloud servers and multiple software entities to be protected, to determine whether certain security properties are likely to be held or not. The method further includes the step of generating an attestation report by the attestation server based on the verification and interpretation of the security measurement information.

Finally, a system for security health monitoring and attestation of virtual machines in cloud computing systems is provided. The system includes a virtual machine, a hypervisor, a network interface controller, a random access memory, a central processing unit, and a cache memory. Furthermore, the system also includes a monitor module for monitoring and gathering security measurement information inside the virtual machine or outside the virtual machine. It also includes a trust module for hashing and signing the security measurement information using cryptography operations. Finally, the system includes a property interpretation module for interpreting the security measurement information hashed and signed from the trust module.

BRIEF DESCRIPTION OF THE DRAWINGS

The foregoing features of the disclosure will be apparent from the following Detailed Description, taken in connection with the accompanying drawings, in which:

FIG. 12 is a graph showing the relative CPU usage against SPEC Benchmarks.

DETAILED DESCRIPTION

The present disclosure relates to a system and method for security health monitoring and attestation of virtual machines in cloud computing systems, as discussed in detail below in connection with FIGS. 1-13.

Figure 1:
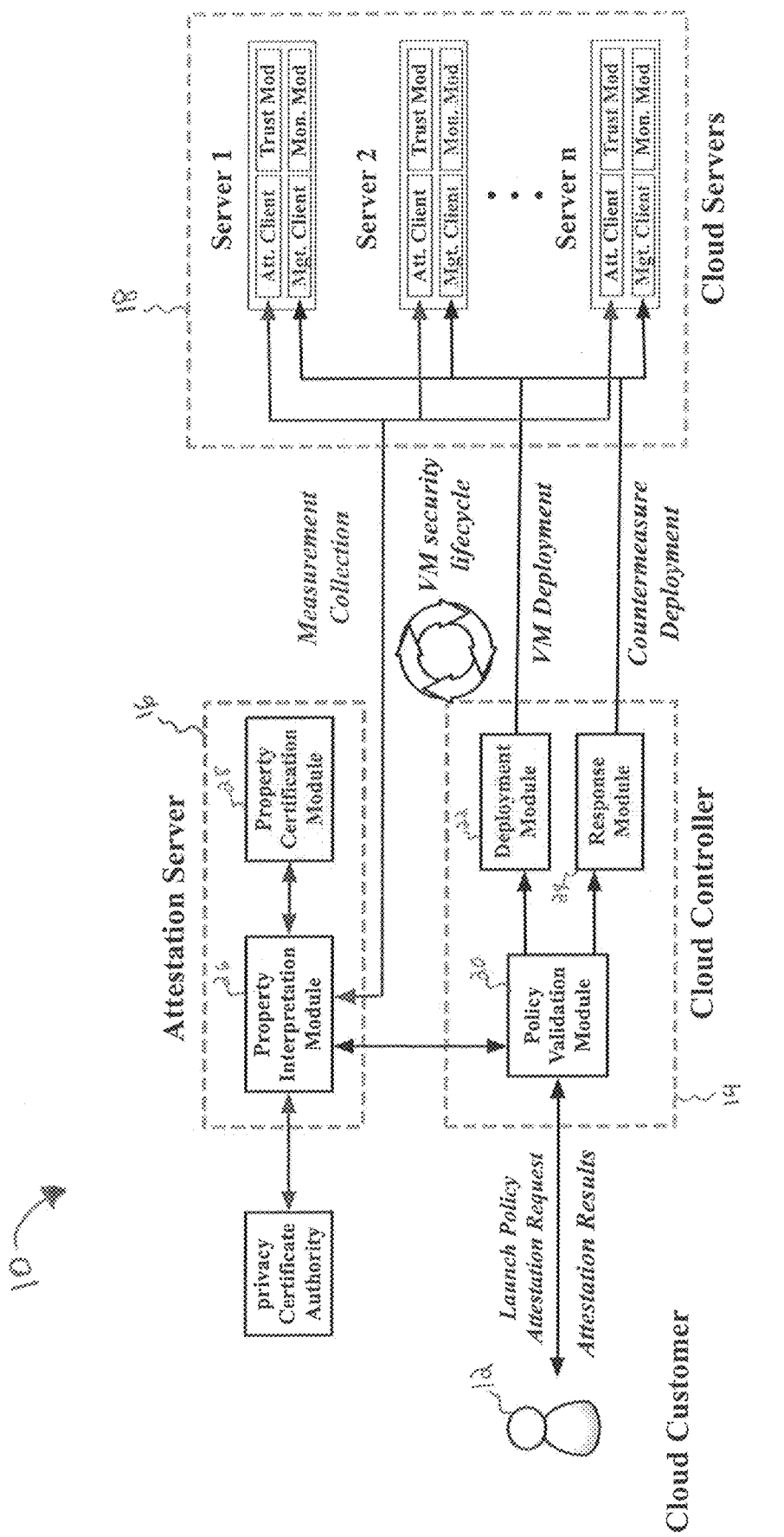
FIG. 1 is a diagram of the system of the present disclosure.

Referring to FIG. 1, a block diagram of the system 10 of the present disclosure will be explained in greater detail. The system 10 includes cloud customer 12, cloud controller 14, attestation server 16 and at least one cloud server 18. The cloud customer 12 is the initiator and end-verifier in the system. The cloud customer 12 places a request for leasing VMs with specific resource requirements and security requests to the cloud controller 14, via a local computer system operated by the cloud customer 12. The cloud customer 12 can issue any number of security attestation requests during a requested VM's lifetime. Table 1 below shows the attestation and monitoring APIs provided to the customers. The symbol "N" refers to a nonce, or a number used once, in cryptographic operations, to prevent replay attacks.

TABLE 1

| Request API | Description |
| --- | --- |
| startup_attest_current (Vid, P, N) | Invoke an attestation of VM Vid for security property P, before launching the VM |
| runtime_attest_current (Vid, P, N) | Invoke an immediate attestation of VM Vid for security property P |
| runtime_attest_periodic (Vid, P, freq, N)) | Invoke a periodic attestation of VM Vid for security property P at the frequency of freq or at random intervals |
| stop_attest_periodic (Vid, P, N)) | Stop a periodic attestation of VM Vid for security property P |

The system 10 allows customers to invoke the monitoring and attestation requests at any time during the VM's lifecycle. The system 10 also gives the cloud customer 12 two modes of operation: one-time attestation and periodic attestation. For one-time attestation, the cloud customer 12 can request the attestation at any time. The attestation server 16 performs the required attestation and sends back the results. For periodic attestation, the cloud customer 12 can ask for periodic attestations with a specified constant frequency, or at randomly spaced intervals. The cloud server 18 supplies the measurements, and the attestation server 16 accumulates and interprets the measurements. The cloud customer 12 receives the one-time attestation report or for periodic attestation, he receives the fresh results periodically and can stop the process at any time.

The cloud controller 14 acts as the cloud manager, responsible for taking VM requests and servicing them for the cloud customer 12. The cloud controller 14 includes a policy validation module 20 which selects at least one cloud server 18 for the customer's 12 requested VMs. The at least one cloud server 18 needs to both satisfy the VMs' demanded physical resources, as well as support the requested security properties and their property monitoring services. A deployment module 22 allocates each VM on the selected cloud server 18. During the VMs' lifecycle, the customer 12 may request the cloud controller 14 to monitor the security properties associated with their VMs. The cloud controller 14 will entrust the attestation server 16 to collect the monitored security measurements from the correct VMs, and send a report back to it. The cloud controller 14 then sends the results back to the customer 12 to keep the customer 12 informed of the VMs' security health. When these results reveal potential vulnerabilities for the VMs, a response module 24 in the cloud controller 14 carries out appropriate remediation responses, as will be explained in greater detail below.

The attestation server 16 acts as the attestation requester and appraiser for the cloud servers, and can include two modules. First, a property interpretation module 26 is responsible for validating measurements, interpreting properties and making attestation decisions. The property interpretation module 26 needs a certificate from a privacy Certificate Authority ("pCA") to authenticate the cloud server 18. The privacy Certificate Authority may be a separate trusted server already used by the cloud provider for standard certification of public-key certificates that bind a public key to a given machine. Second, a property certification module 28 is responsible for issuing an attestation certificate for the properties monitored. There can be a different attestation server 16 for different clusters of cloud servers 18, enabling scalability of the system 10. The attestation server 16 can be responsible for security monitoring and attestation while the cloud controller 14 is responsible for management. This division of responsibilities between the attestation server 16 the cloud controller 14 achieves better scalability, since an additional attestation server 16 can be added to handle more cloud servers 18. The division of responsibilities further consolidates property interpretation in the attestation server 16, rather than replicating this in each cloud server 18, or burdening the cloud controller 14. Further, this also achieves better "separation of duties" security, since the cloud controller 14 need only focus on cloud management while the attestation server 16 focuses on security. Finally, the division of responsibilities also improves performance by preventing a bottleneck at the cloud controller 14 since the cloud controller 14 does not need to handle management as well as a myriad of attestation requests and security property interpretations. The cloud server 18 is the computer that runs the VM in question and is the attester in the system 10. The cloud server 18 provides different measurements for different security properties.

The attestation server can base its interpretation of security health from one VM on one cloud server, or on multiple VMs on one cloud server, or from multiple cloud servers. If an attestation server serves only a fraction (cluster) of the cloud servers, it can be connected to other attestation servers either hierarchically or in peer-to-peer connections, to interpret the security health of the entire data center of the cloud computing system.

Figure 2:
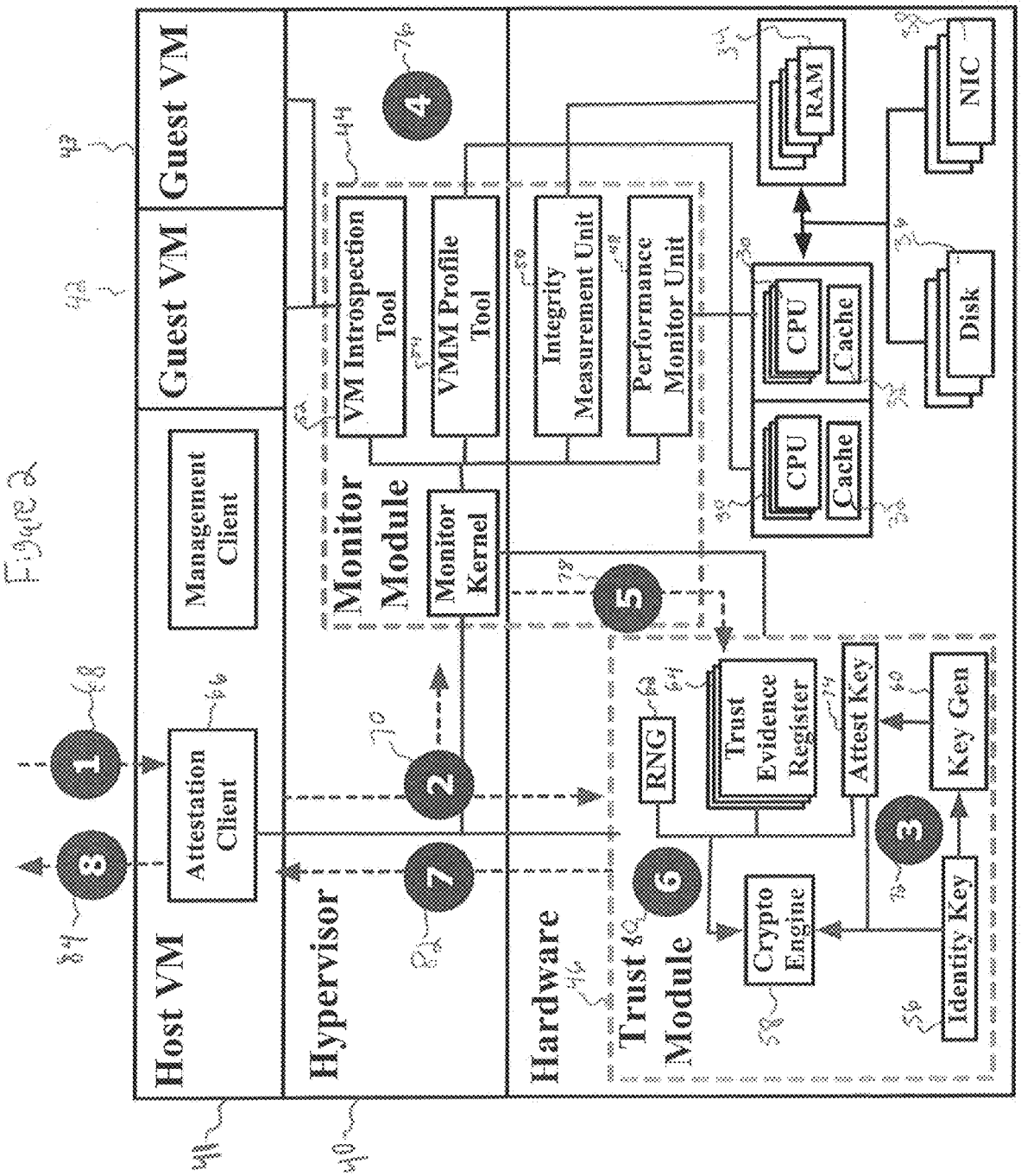
FIG. 2 is a diagram illustrating the cloud server of FIG. 1 in greater detail.

FIG. 2 shows the structure of the cloud server 18 in greater detail. The cloud server 18 includes a plurality of central processing units ("CPU") 30, a plurality of cache memories 32, a plurality of random access memories 34 ("RAM"), a plurality of disks 36, and a plurality of network interface controllers ("NICs") 38. In addition to the hardware components, the cloud server 18 also includes a hypervisor 40. The cloud server 18 executes the hypervisor and a privileged VM called the host VM 41 (also called Dom0 in Xen, a Type-1 Hypervisor) running over the hypervisor 40. Not all the cloud servers in the cloud provider's data center have to be trusted—only those servers on which security monitoring is necessary need to be secure at least in the operation of the two modules: a monitor module 44 and a trust module 46 which are added to augment security. That is, these two hardware modules 44 and 46 are in the hardware Trusted Computing Base (TCB). The TCB contains all components (software, hardware or networking) that must be trusted in order for the system's security policy to be correctly enforced. It is desirable to reduce the TCB to reduce the attack surface for an attacker. In the present invention, the TCB includes the cloud controller 14, the attestation server 16, and only the monitor module 44 and the trust module 46 of a cloud server 18 that supports security health monitoring and attestation. It should also be noted that the disclosure of the present application is not limited to a VM but can include any software entity to be protected. Further, the disclosure of the present application is not limited to a hypervisor but can include an operating system or a system software that manages the software entity to be protected.

The monitor module 44 can contain different types of monitors to provide comprehensive and rich security measurements. These monitors can be software modules or existing hardware mechanisms like performance counters or a TPM chip. For example, a hardware performance monitor unit 48 has numerous hardware performance counters to collect runtime measurements of the VMs' activities and the cloud server's activities. An integrity measurement unit 50 (which could use a TPM chip) can be used to measure accumulated hashes of the system's code and static data configuration. In the hypervisor 40, a VMI introspection tool 52 can be used to collect the information inside the specified VM, and a VMM profile tool 54 can be used to collect dynamic information about the VM's 41 activities and the guest VMs' 42 and 43 activities. It should be noted that two guest VMs are shown in FIG. 2, but a cloud server 18 could include more guest VMs.

The trust module 46 is responsible for server authentication using an identity key 56, crypto operations using a crypto engine 58, key generator 60 and random number generation 62 ("RNG"), and secure measurement storage using a plurality of trust evidence registers 64. By using separate trust evidence registers 64 to store the security health measurements (trust evidence), the RAM 34 need not be included in the trust module 46 or in the system's Trusted Computing Base. However, a trusted RAM (not shown) can also be used instead of trust evidence registers 64 in the trust module 46. Trust module 46 and monitor module 44 can be implemented on a separate co-processor or on the same processor.

FIG. 2 also shows the functional steps taken by the monitor module 44 and the trust module 46. The cloud server 18 includes an attestation client 66 in the host VM 41 that runs step 68 to take requests from the attestation server 16 to collect a set of measurements. The attestation client 66 invokes the monitor module 44 in step 70 to collect another set of measurements. The attestation client 66 also invokes the trust module 46 in step 72 to generate a new attestation key 74 for the current attestation session. The RNG 62 and key generator 60 facilitate the generation of new attestation key 74. This new attestation key 74 is signed by the trust module's identity key 56. The required measurements of suspicious events or evidence of trustworthy operation are collected from the monitor module 44 in step 76. Then in step 78, the data collected from the monitor module 44 is stored in the trust evidence registers 64. The trust evidence registers 64 are analogous to performance counters used for evaluating the system's performance, except that they measure aspects of the system's security. The trust module 46 in step 80 invokes crypto engine 58 to sign these measurements. In step 82, the trust module 46 forwards the data from the trust module 46 to the attestation client 66 which sends the data to the attestation server 16 in step 84.

The attestation server 16 can obtain these measurements from a plurality of VMs 42 running on the cloud server 18, or from a plurality of VMs running on a plurality of cloud servers. Indeed, the plurality of attestation servers 16 can monitor the entire data center. The attestation servers 16 can be arranged hierarchically: each attestation server 16 can collect measurements from a plurality of cloud servers 18, and send these measurements, or interpretations of these measurements to a higher level attestation server (not shown in FIG. 2, but as will be clear to one versed in the art). Thus security properties can be interpreted for a single VM, for a single cloud server, across multiple VMs, across multiple servers, and across the whole data center of the cloud computing facility.

Guest VMs 42 and 43 can be threatened or attacked by hostile VMs running in the cloud on the same cloud server, or hostile applications or services running inside the VMs that try to breach the confidentiality or integrity of a victim VM's data or code. Hostile VMs may also try to breach its availability, in spite of the cloud provider having allocated the VM its requested resources. The cloud provider is assumed to be trusted (with its reputation at stake), but may have vulnerabilities in the system. VM 41 as a part of the Xen hypervisor is therefore also trusted. However, it can also be monitored and measured. Other hypervisors do not have a host VM 41, so for generality, we consider mainly the guest VMs 42 and 43. It is assumed that the cloud controller 14 and the attestation server 16 are trusted in that they are correctly implemented with secure bootup and are protected during runtime. However, the cloud servers 18 need not be trusted, except for the trust module 46 and monitor module 44 in each cloud server 18. There may be thousands of cloud servers in the system 10 that are not trusted since they do not have the trust module 46 and monitor module 44. Note that the trusted cloud controller 14 and the trusted attestation server 16 can be redundancy protected for reliability and security, and are only a small percent of all the servers in the cloud's data center. These form the trusted computing base, as described earlier.

There can be two types of adversary's capabilities: (1) an adversary, who tries to exploit vulnerabilities in the customers VM 42, either from inside the VM 42, or from another malicious guest VM 43 co-resident on the same server; and (2) an active adversary who has full control of the network between different servers. The adversary is able to eavesdrop as well as falsify the attestation messages, trying to make the customer 12 receive a forged attestation report from the cloud controller 14 without detecting anything suspicious. With regard to this second type of adversary capability, the present application has secure monitoring and attestation protocols. By way of example throughout the disclosure of the present application, the guest VM being attacked can be VM 42 and the attacker can be VM 43 as shown in FIG. 2.

The attestation protocol in the present application is unforgeable even in the presence of the network attacker and the other attackers in the untrusted cloud servers. In a distributed architecture where communication is over untrusted networks, the protocols are an essential part of the security architecture because they establish trust between the customer and the cloud provider, and between different computers in the cloud system. The unforgeable attestation protocol in the present application has secure communications between the customer 12, cloud controller 14, attestation server 16, and cloud servers 18. The unforgeable signatures of the measurements and the attestation report can be sent between the place of collection in the cloud server 18, the attestation server 16, cloud controller 14, and the customer 12.

For secure communications over networks, the present application can have the customer 12, cloud controller 14, attestation server 16 and secure cloud servers 18 implement the SSL protocol. The contents of the SSL messages, the keys, and the signatures required will now be described in greater detail. The disclosure of the present application is not limited to the specifics detailed below, and these details are only provided as an example for implementation of the SSL protocol.

Figure 3:
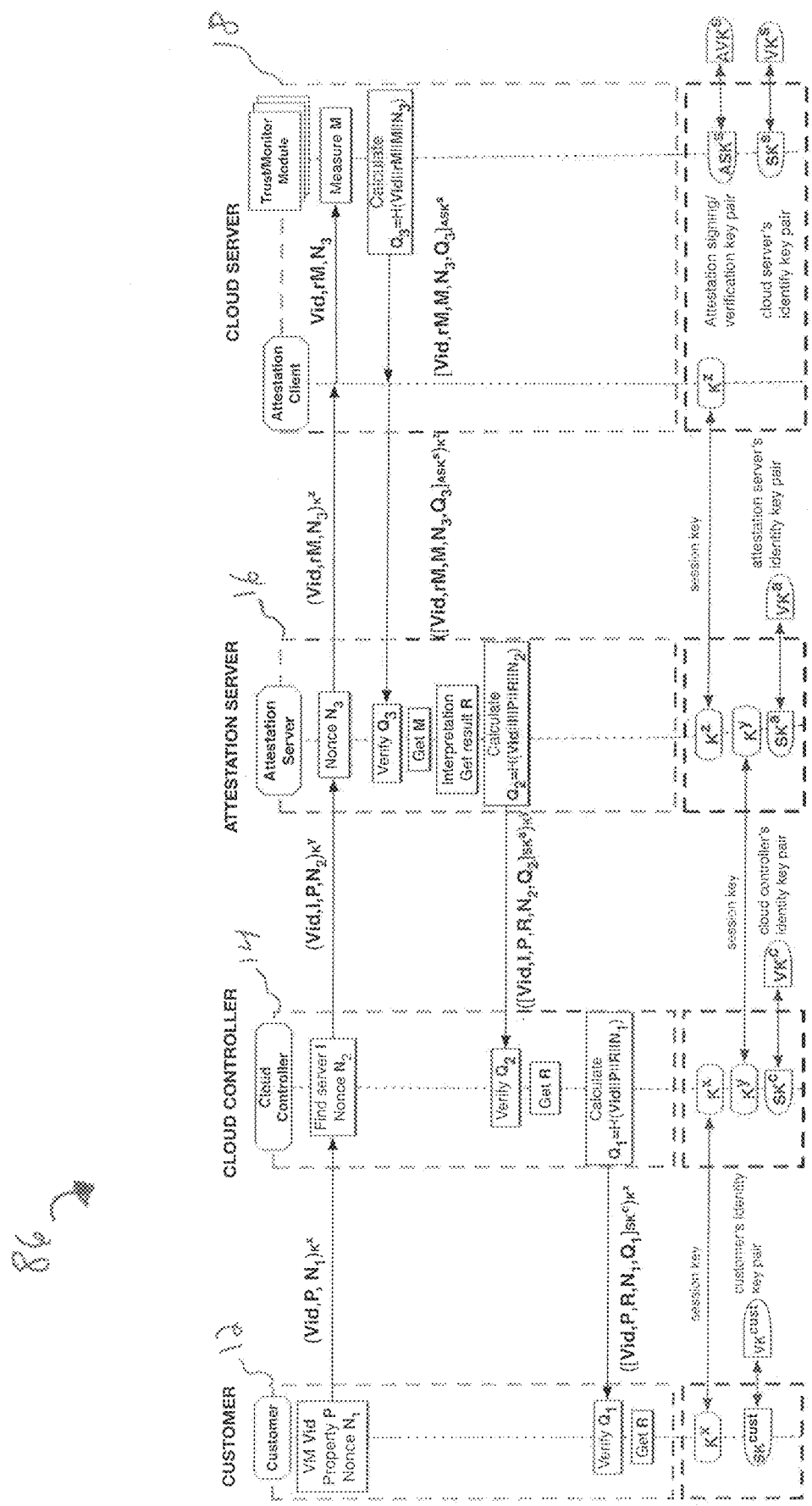
FIG. 3 is a diagram illustrating the attestation protocol of the present disclosure.

Referring now to FIG. 3, an attestation protocol diagram 86 illustrates the attestation protocol in greater detail. Initially, the customer 12 sends an attestation request to the cloud controller 14. The attestation request includes the VM identifier, Vid, the desired security properties P and a nonce N1. The cloud controller 14 knows the current mapping of all the VMs to their assigned cloud servers 18, and can therefore add cloud server identifier I to the attestation request upon sending the request to the attestation server 16. The attestation server 16 then requests security monitoring measurements (rM) from the specific cloud server 18 where the VM 42 is running. The cloud server 18 collects the required measurements M, calculates the quote Q3 as the hash value of (Vid, rM, M and nonce N3), and sends these values back to the attestation server 16. The attestation server 16 checks the signature and hash values, interprets the measurements M and property P, and generates the attestation report R. This attestation report is signed by the attestation server 16 and transmitted securely to the cloud controller 14, and then signed by the cloud controller 14 and transmitted back to the customer 12. Three different nonces N1, N2 and N3 are used to prevent replay attacks over the three communication channels between each successive pair of servers, for each attestation request.

For secure storage, the trust module 46 provides trust evidence registers 64 with attestation measurements, which are only accessible to the trust module 46 and monitor module 44. Accesses to the databases in the cloud controller 18 and the attestation server 16 are also protected to ensure data confidentiality and integrity.

The attestation protocol shown in the attestation protocol diagram 86 uses cryptographic keys. The cloud controller 14, attestation server 16 and each secure cloud server 18 can have one long-term public-private key-pair that uniquely identifies it within the system 10. Each secure cloud server 18 can own a pair of public-private identity keys, $\{VK^s, SK^s\}$. The private key, $SK^s$, can be burned into (or, hard-wired into) the trust module 46 when manufactured, or more preferably, securely written into a non-volatile and tamper-proof register in the trust module 46 when the server is first deployed in the cloud data center. This private key, $SK^s$, must not be released outside of the trust module 46 to maintain security. The public key, $VK^s$, can be used to authenticate the cloud server 18. The cloud server 18 can use this identity key-pair to generate a temporary key pair for each attestation request.

A new session-specific key-pair, $\{AVK^s, ASK^s\}$, can be created by the trust module 46 whenever an attestation report is needed, so as not to reveal the location of a VM. For example, an attacker may try to find the server which hosts the victim VM, and then he or she can try to co-locate his attacker VM on the same server. The new session-specific key-pair helps the attestation protocol in preventing an attacker from finding the server which hosts the victim's VM. The public attestation key $AVK^s$ can be signed by the cloud server's $SK^s$ and sent to the pCA for certification. The pCA can verify the signature via $VK^s$ and issue the certificate for $AVK^s$ for that cloud server 18. This certificate enables the attestation server 16 to authenticate the cloud server "anonymously" for this attestation.

For secure communications between the servers in system 10, SSL can first authenticate sender and receiver using their public-private key-pairs, and then generate symmetric session keys for encrypting the messages passed between each pair of servers. For example, FIG. 3 shows the communications between the customer 12 and the cloud controller 14 protected with a symmetric session key $K^x$, between the cloud controller 14 and the attestation server 16 with a symmetric session key $K^y$, and between the attestation server 16 and cloud server 18 with symmetric session key $K^z$.

Secure monitoring is also necessary to combat an active adversary who has full control of the network between different servers as mentioned above. The security health of a VM 42 is defined as an indication of the likelihood of the VM's 42 security being affected by the actions of a hostile VM 43 co-resident on the same cloud server 18, or hostile applications, services or malware within the VM 42 itself. Different indicators of different aspects of security health can be monitored. These different aspects of security can be the security properties requested by the customer 12. These security properties can be monitored by the various monitors in the cloud server's monitor module 44 or collected by the trust evidence registers 64 in the trust module 46. The architecture of the system 10 is flexible and allows the integration of an arbitrary number of security properties and monitoring mechanisms, including, but not limited to, checking integrity, confidentiality and availability protection, and logging, auditing and provenance mechanisms.

As explained above, to monitor and attest a security property, three requirements can be satisfied: (1) the attestation server 16 can translate the security property requested for attestation by the customer 12, to the measurements to request from the target cloud server 18; (2) the target cloud server 18 implements a monitor module 44 that can collect these measurements, and a trust module 46 with a crypto engine 58 can securely hash and sign the measurements and send them back to the attestation server 16; and (3) the property interpretation module 26 in the attestation server 16 is able to verify the measurements and auxiliary information, and interpret if the security property is satisfied.

The attestation server 16 can have a mapping of security property P to measurements M. This gives a list of measurements M that can indicate the security health with respect to the specified property P. The attestation server 16 can also behave as the property interpreter and decision maker: when it receives the actual measurements M from the cloud server 18 and VM 42, it can judge if the customers' 12 requested security properties are being enforced. Alternatively, the attestation server 16 may just pass back the measurements M without performing any interpretation or initiating any remediation responses. There are many possible security properties that the customer 12 may want. Some specific properties can include, but are not limited to, the cornerstone security properties of confidentiality, integrity and availability. The disclosure of the present application is flexible enough to support a variety of mechanisms for detection that will be explained in greater detail. New methods of detection can easily be integrated into the system 10.

The customer 12 could want to check the integrity of both the host platform 41 and the VM 42 before launching the VM 42 in the cloud. For example, attackers (inside-VM or outside-VM) may try to launch a malicious hypervisor, host OS, or guest OS. These software entities could have been corrupted during storage or network transmission. Similarly, the VM image could have been compromised, with malware inserted. The monitoring mechanism to deal with this threat could involve using accumulated cryptographic hashes of the software that is loaded onto the system 10, in the order that they are loaded. A standard TPM chip can be used, and integrated into the hardware platform. The measurement can be done in two phases. First, the cloud server's platform configuration (hypervisor, host OS, etc.) is measured (i.e., hashed) during the cloud server bootup. Second, the VM image can be measured before VM 42 launch. The attestation server 16 can have full knowledge of the attested software, and the correct pre-calculated hash values of its executable files. The attestation server 16 can use these correct values to check the hash measurements sent back by the cloud server 18, and issue the integrity property attestation, if the hash values match. Alternatively, the attestation server 16 can use a trusted appraiser system, which are known to those of ordinary skill in the art, to check if the measured hash values conform to the correct values for a pristine, malware-free system, before sending the attestation back to the customer 12.

The customer 12 could want to know if the VM 42 is infected with malware during runtime, not just at startup time as with TPM-based attestation described above. The attacker can spread viruses into the customer's VM 42. Then the malware inside-VM can compromise the customer's critical programs. Once the malware gets root privilege in the OS, it can compromise the VM 42. The monitoring mechanism to address this threat is to monitor the VM's health using VMI implemented as a hypervisor-level monitor. VMI allows the hypervisor 40 to monitor the VM 42 from outside the VM, and examine the states of the target VM. Different VMI tools known to those of ordinary skill in the art can be used to detect and analyze the malware inside VM 42. These tools can be integrated into system 10. For example, when the customer 12 asks to check if there is malware running as a background service and hiding itself in the target VM 42, the attestation server 16 can issue a request for getting the list of running tasks for that VM 42. The VM introspection tool 52 located in the hypervisor's 40 monitor module 44 can probe into the target VM's memory region to obtain the running tasks list. This information can be written into the trust evidence registers 64 (or encrypted and hashed, then written to untrusted RAM memory, with a pointer, a length value and a cryptographic key written into the trust evidence registers 64) and transmitted back to the attestation server 16. The customer 12 can compare this actual task list in the returned attestation report and compare it with the report the customer 12 gets from querying the corrupted guest OS, to detect the malware running in customer's 12 VM 42.

For VMs 42 with confidential code or data, cryptography can be used to protect confidential data-at-rest and data-in-transit. However, during execution, the confidential data can be decrypted and any secret key being used can also be decrypted. During this time, although VMs 42 are protected (isolated) from each other by the hypervisor 40, it can still be possible to leak the secret crypto key used, via a cross-VM covert channel or side channel. For example, hypervisors enable memory protection by enforcing isolation between VMs. However, covert channels still exist across VMs running on the same server. A covert channel exists when a colluding insider (e.g., a program inside the victim VM) can use a medium not normally used for communications to leak secret information to an unauthorized party in another VM. No security policies are overtly broken by overt communications, but are broken by covert communications. When VMs 42 on the same server share physical resources, the contention for these shared resources can leak information, e.g., in the form of timing features. For side channels, the shared cache 32 can be exploited by a hostile VM to extract crypto keys from the victim VM. For covert channels, two VMs can encode and transmit information by generating certain characteristics of the shared hardware, which can be detected in certain cases as is known by those of skill in the art. For example, different cache operations (hit or miss), or memory bus activities (locked or unlocked bus), can be indicative of certain side-channel or covert channel operations, and may be detectable with new hardware monitoring features.

Figure 4:
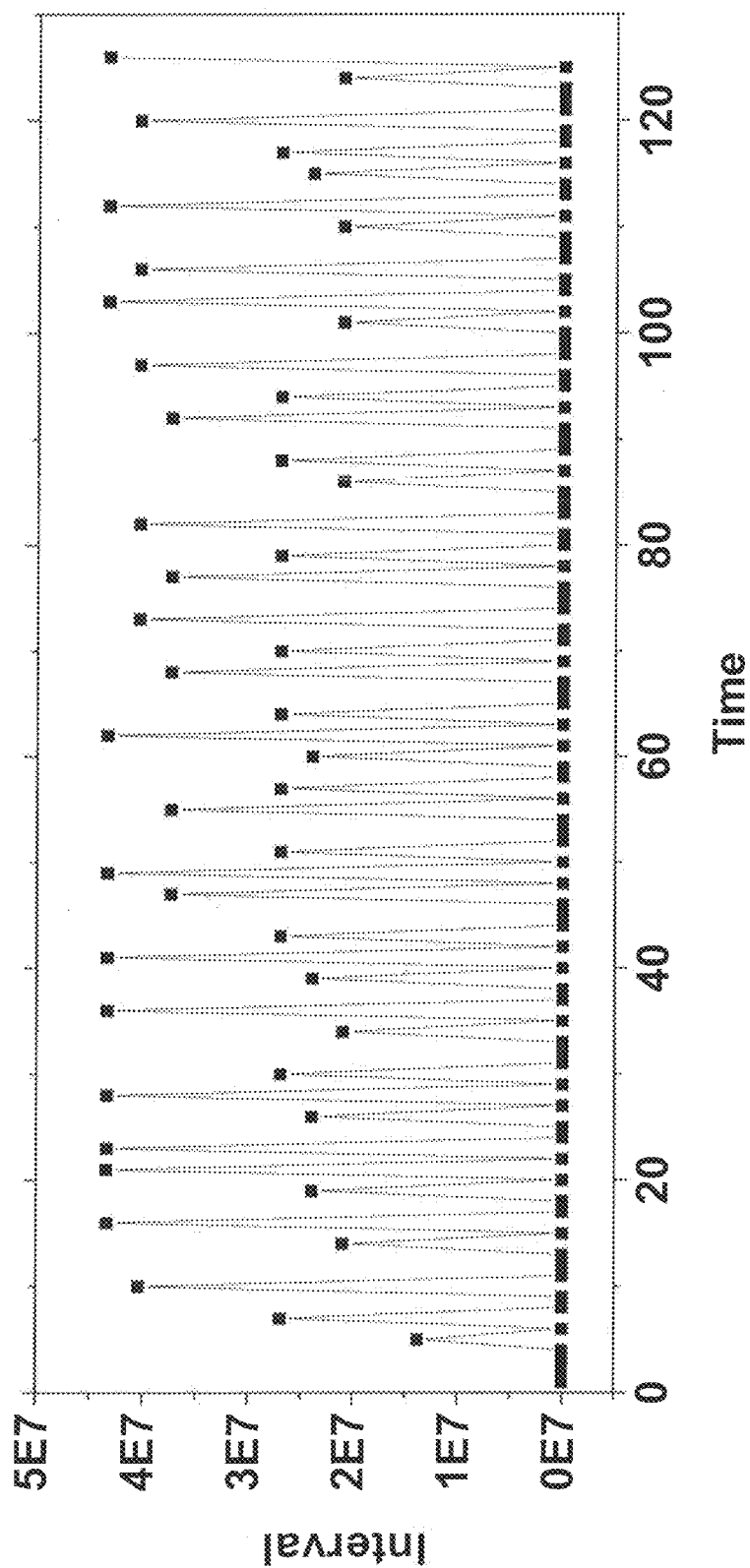
FIG. 4 is a graph showing the sender VM's CPU usage as observed by the receiver's VM.

It is easy to leak information through a covert channel. For example, in the case of a CPU-based cross-VM covert-channel attack, the covert channel can use the CPU 30 as the channel medium to transmit information. The sender VM can occupy the CPU for different amounts of time, to indicate different information such as, long CPU usage indicates a "1" while short CPU usage signals a "0." For example, in Xen, the sender VM can trick the Xen scheduler to achieve a fine control over CPU usage. It first requests two colluding virtual CPUs and keeps them idle for some time to build up Xen scheduling credits. Then the main attacker vCPU can sleep to yield the CPU resource, or wake up by exploiting Inter Processor Interrupts (IPI) from the other vCPU to the main attacker vCPU, to give it high priority with the scheduler. When the sender main vCPU and receiver VM share the same CPU 30, the receiver VM can measure its own execution time, to infer the sender VM's CPU activity, and thus, infer the covert channel information leak. FIG. 4 shows the sender VM's CPU usage, observed by the receiver's VM. This covert channel has a high bandwidth of 200 bps.

Figure 5:
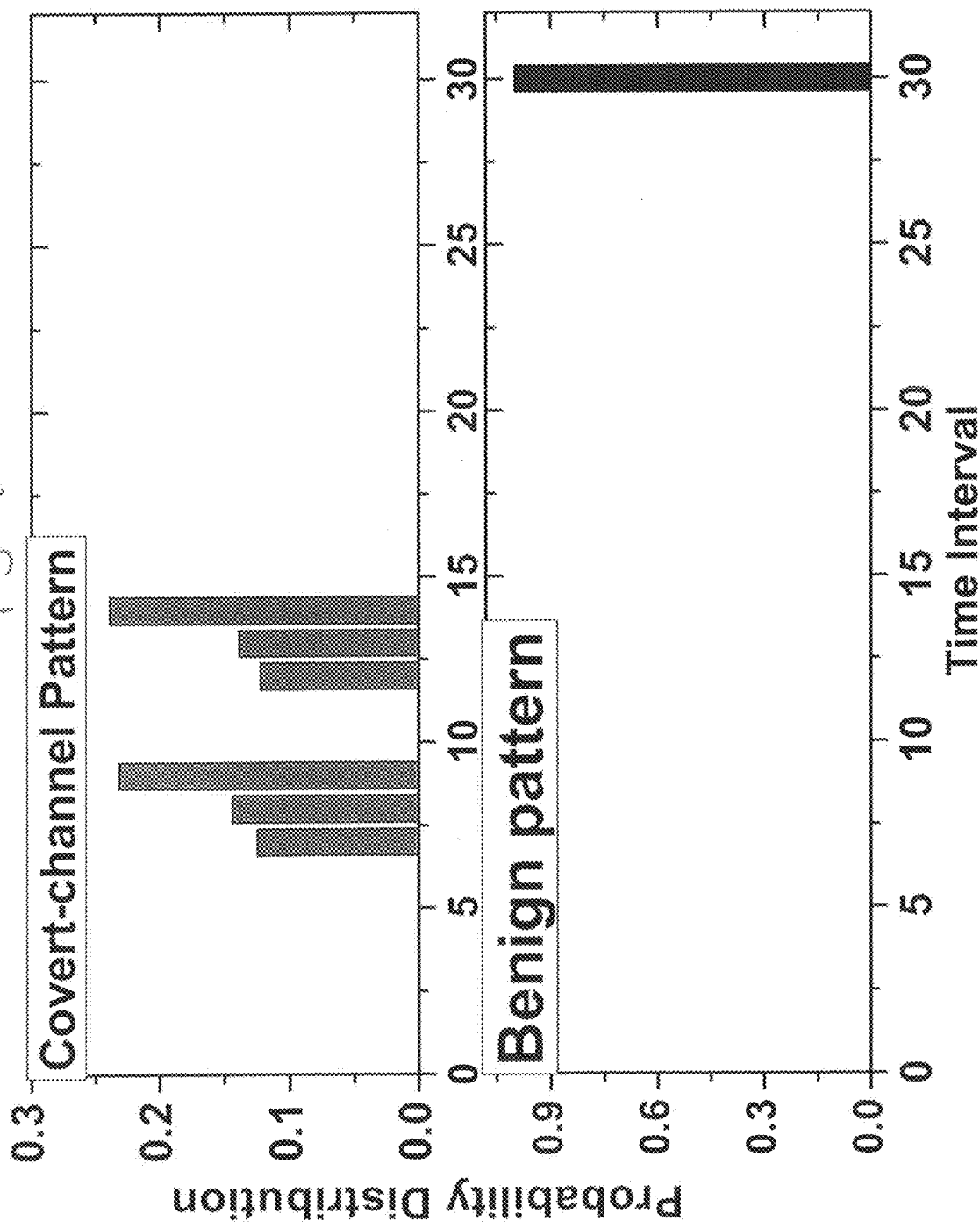
FIG. 5 is a graph showing the calculated probability distribution of the CPU usage intervals for covert channel vulnerabilities.

The system 10 can implement a monitoring mechanism to address the covert channel attack. Covert channels are based on contention for shared resources. Programs involved in covert channel communications give unique patterns of the events happening on such hardware. The attestation server 16 invokes the monitor module 44 on the target cloud server 18 to collect the necessary information for real time analysis. To address a CPU based covert channel attack, the system 10 can use CPU usage intervals to detect the existence of the covert channel attack. Using CPU usage is done by way of example only, and the disclosure of the present application is not limited by using CPU usage as the covert channel medium. For side-channel detection, depending on the type of side channel attack, a different metric can be used other than CPU usage to monitor side channel attacks. In relation to CPU usage, an interval granularity can be set as 1 ms by way of example only. Since the default execution interval is 30 ms, the system 10 can use 30 programmable trust evidence registers 64 to count the occurrence of each CPU usage interval experienced by the sender VM. Suppose, by way of example only, the sender VM executes for 4.6 ms; then, the $5^{th}$ trust evidence register 64 can be incremented by 1. This represents CPU usage between 4 to 5 ms during this time interval. The distribution of CPU usage intervals can reveal the existence of covert channels when the sender VM maliciously changes his shared CPU usage to transmit information. After a certain detection period, the 30 trust evidence registers 64 give the distribution of the different CPU usage intervals. These 30 values are sent as the security health measurements for detecting this type of covert channel communications. When the attestation server 16 receives the 30 values, the property interpretation module 26 calculates the probability distribution of the CPU usage intervals, which is shown in FIG. 5. If a covert channel exists, the distribution graph gives two peaks: each peak representing the activity of transmitting a "0" or a "1", respectively. For a benign VM, the graph typically shows one peak for the default interval of 30 ms. The attestation server 16 can use machine learning techniques to cluster the covert-channel results and benign results. The example above uses 30 bins, but fewer bins can be used to save space or more bins to increase accuracy. This is only one type of covert channel and other types of covert channels can also be monitored with more trust evidence registers 64 and mechanisms. The system 10 could also be designed to switch randomly between monitoring different sources of covert channels, and use the periodic attestation mode.

Availability of the resources and services agreed upon by the cloud customer and the cloud provider in the Service Level Agreement ("SLA") is a very important security problem in cloud computing systems, which is susceptible to possible attacks. Even if over-provisioning is practiced, the cloud provider is still responsible for providing a fair resource allocation for each VM 42 based on its SLA. During runtime, the customer 12 could want to know if his or her VM 42 is given the requested resources as paid for. An attacker may try to get more resources to severely reduce the availability of shared resources to a victim VM, thus degrading its performance. This may be to improve the attacker's own performance, or it may just be to attack the victim and deny rightful use of cloud resources. To achieve this goal, the attacker VM can change its own workloads to steal more resources from the victim. The attacker can also change the victim VM's behavior to give up computing resources to the attacker. Also, an attack can target the boost mechanism of a credit scheduler algorithm. Specifically, each VM receives some credits periodically, and the running VM pays out credits. The scheduler wakes up the VM with extra credits in Round-Robin order. However, when a VM is woken up by certain interrupts, it always gets higher priority to take over the CPU. So the attacker's strategy can be to launch a VM with multiple vCPUs and use them to keep sending and receiving Inter Processor Interrupts (IPIs) to each other, so one of the attacker's CPUs always has the highest priority. Since the attacker's VM always has higher priority than the victim VM, the attacker's VM consumes a lot of CPU resources, thus starving the victim's CPU usage.

Figure 6:
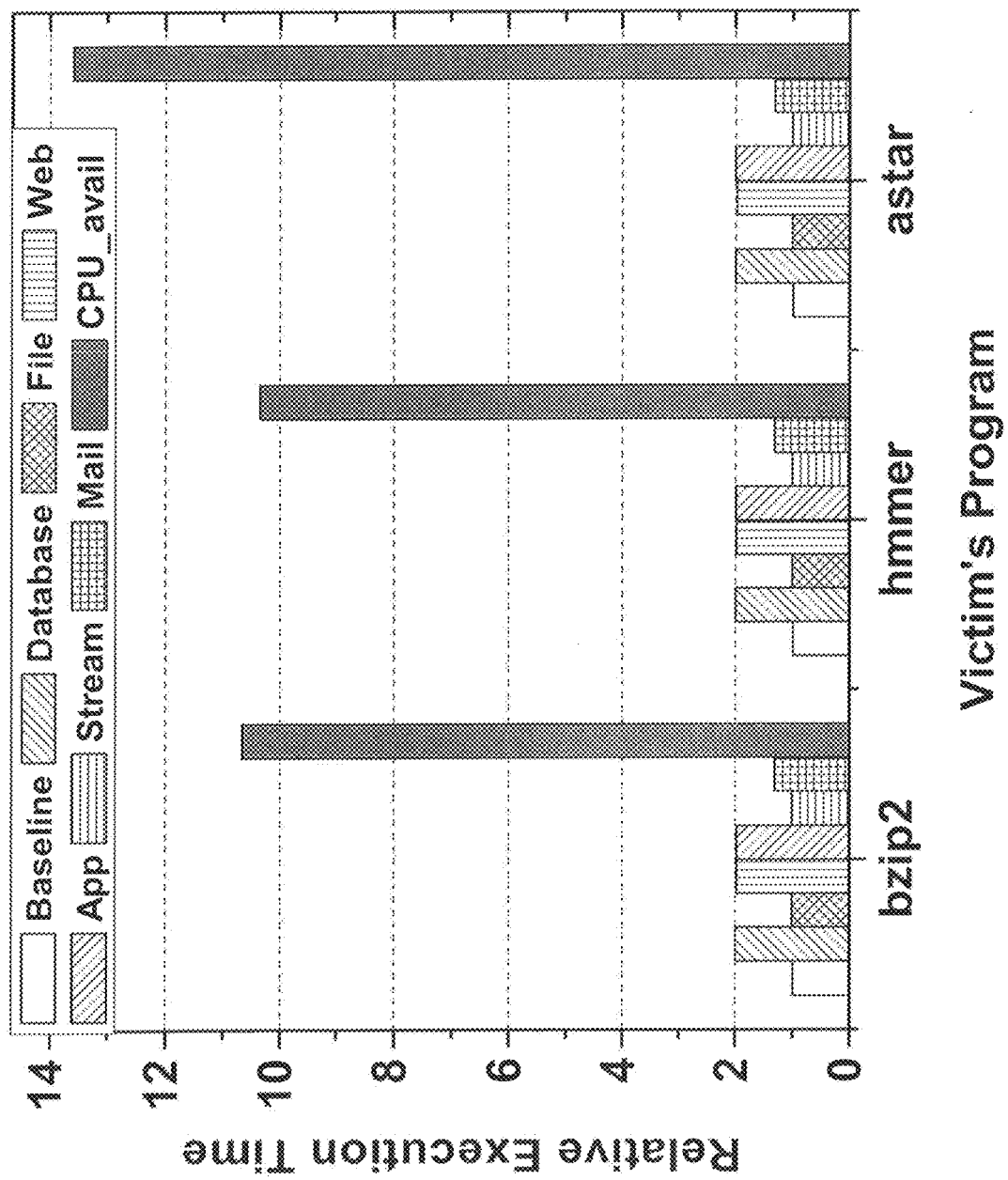
FIG. 6 is a graph showing performance for CPU availability attacks.
Figure 7:
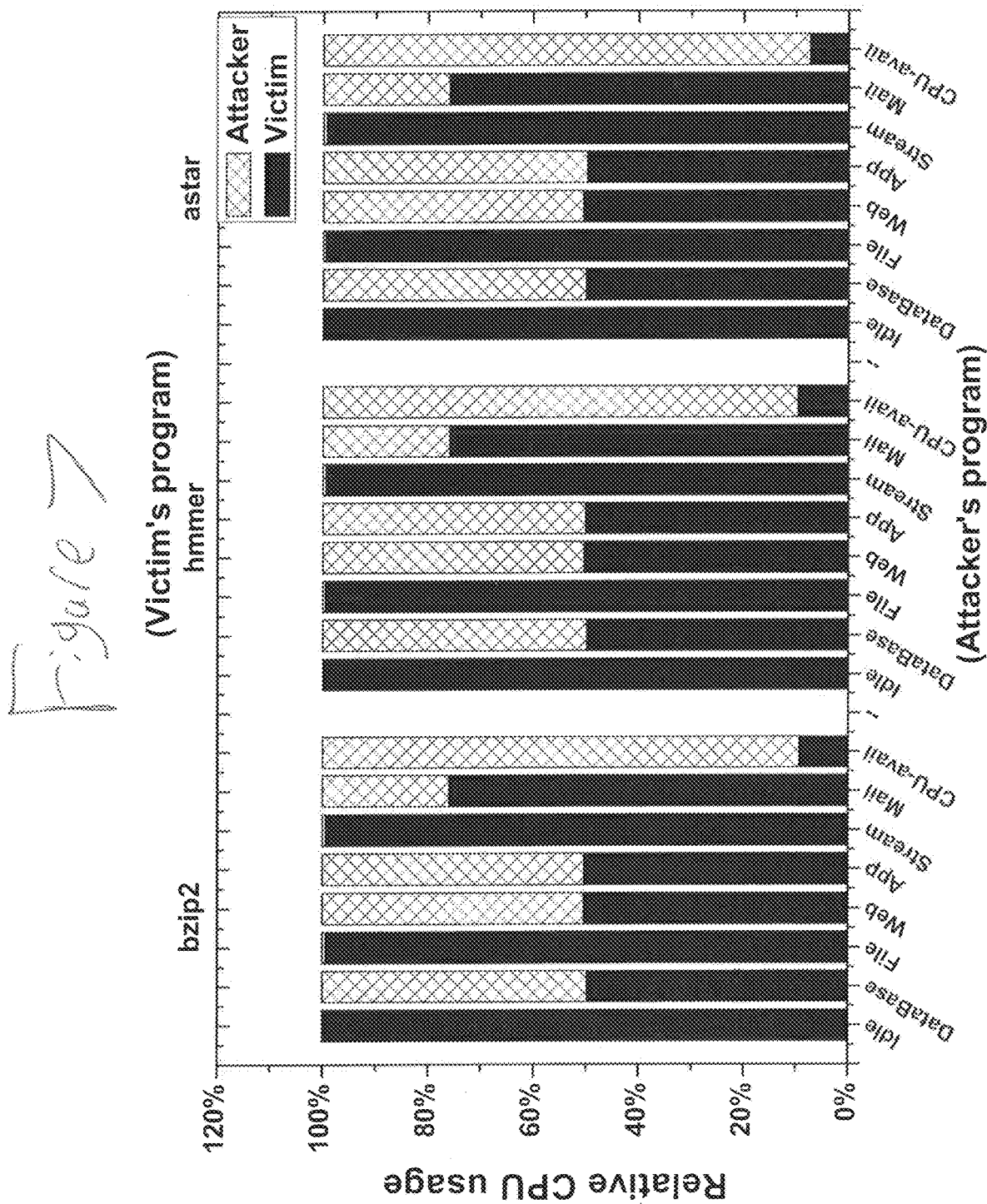
FIG. 7 is a graph showing the measurements of CPU availability when the system is running benign applications and when it is running a resource contention availability attack.

FIG. 6 shows the results for the denial of CPU service attack. The attacker VM and victim VM are located on the same CPU using a Xen hypervisor. The victim VM runs three CPU-bound programs from the SPEC2006 benchmark suite. The attacker VM runs different services typically done in the cloud, as well as the CPU availability attack described above. When the attacker is I/O-bound (File, Stream or Mail servers), the attacker does not consume much CPU and the victim VM has no performance degradation. When the attacker runs CPU-bound tasks (Database, Web or App servers), the victim's execution time is doubled since it can get a fair share of 50% of the CPU quota. However, when the attacker performs the CPU availability attack described above, the victim's performance is degraded by more than ten times. The system 10 can have a monitoring mechanism to address the CPU service attack. The system 10 can measure the resource usage of the attested VM, such as CPU usage in this example. During the testing period for CPU availability, the VMM profile tool 54 (see FIG. 2) measures the attested VM's CPU time and observes the transitions of each virtual CPU on each physical core CPU 30. The VMM profile tool 54 keeps record of the virtual running time for the attested VM. After the testing period, the VMM profile tool 54 stops the measurements and calculates the total virtual running time: CPU_measure. This measurement is written into one trust evidence register 64, signed by the trust module 46 and sent back to the attestation server 16. The attestation server 16 retrieves the attested VM's 42 virtual running time and calculates the relative CPU usage as the ratio of a VM's 42 virtual running time to real time. If the relative CPU usage is very small, then the attestation server 16 interprets the VM's CPU availability as compromised. An example graph of a compromised VM CPU is show in FIG. 7, where the last column in each of the 3 sets of columns shows the compromised VM CPU when the CPU_avail attack is running.

Attestations can be performed at all stages of a VM's lifecycle, during VM launch, during its runtime, before and after any VM migrations and on VM termination. Startup attestation can ensure that the VM is correctly initialized and launched. This is an attestation of the integrity of the platform and the VM image. If the platform's integrity is compromised, the system 10 will select another qualified cloud server 18 for hosting this VM 42. If the VM image is compromised, then the VM launch request will be rejected. If both the VM 42 and platform pass the integrity checks, then VM 42 will be successfully launched on the cloud server 18. The system 10 provides a flexible protocol for monitoring the VM's runtime activities as described above. The customer 12 can issue a one-time attestation request, or a periodic attestation request, during the VM's execution to monitor its health. The system 10 provides a set of responses to a VM 42 when the system 10 is compromised or under attack. In response to the fact that the system 10 is compromised or under attack, the system can do at least one of the following things: (1) the cloud controller 14 can shut down the VM 42 to protect it from attacks; (2) the cloud controller 14 can temporarily suspend the VM 42 when it detects the platform's security health may be questionable (meanwhile, the system 10 can initiate further checking and also continue to attest the platform; if the attestation results show the cloud server 18 has returned to the desired security health, the cloud controller 14 can resume the VM 42 from the saved state); and (3) when the security health of the current cloud server 18 is questionable or the cloud server 18 has been compromised, the cloud controller 14 can try to find another secure cloud server 18 that can satisfy the VM's security property requirements. If a suitable cloud server 18 is found, the cloud controller 14 can migrate the VM 42 to that cloud server 18. Otherwise, the VM 42 is terminated, or temporarily suspended, for security reasons. The VM 42 may need to migrate to other cloud servers 18 due to resource optimization, or for security reasons. The system 10 finds a qualified cloud server 18 that supports this VM's 42 security and attestation needs. The VM 42 may need to be shut down if no suitable cloud server 18 is found.

Figure 8:
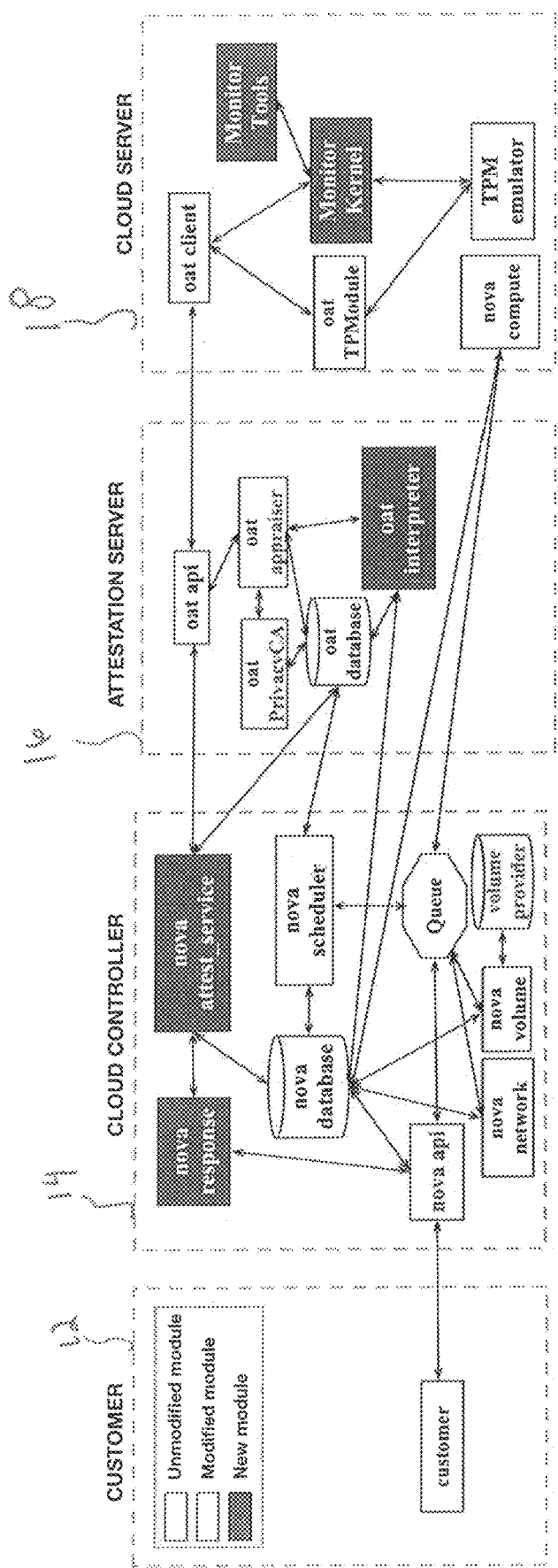
FIG. 8 is a diagram illustrating an implementation of the system of the present disclosure.

Referring now to FIG. 8, the implementation of system 10 will be discussed in greater detail. The property-based cloud attestation can be implemented on the OpenStack Havana platform, as an example implementation. For host remote attestation protocols, OpenAttestation software ("oat") can be used. A TPM-emulator known to those of skill in the art can be used to emulate the functions of the trust module 46 as discussed in the present application. As will be discussed in greater detail below, emulating the trust module 46 has little impact on the system 10 performance. The disclosure of the present application is not limited by the implementation discussed above and any other suitable means known to those of ordinary skill in the art can be implemented in the current system.

The cloud controller 14 can be implemented by the OpenStack Nova. Three modules in Nova are modified to implement the system 10. First, the nova api is modified in that the system 10 extends the VM launch command with the monitoring and attestation options. In particular, when launching VMs, the customer 12 can specify which properties they want to monitor for their VMs. When the cloud provider searches for a destination machine for initial VM allocation or migration, it must choose cloud servers 18 which support such properties. Four new commands are added as shown in Table 1 (reproduced above) to enable the customer 12 to monitor the VM's 42 health. The customer 12 can provide the security properties they want to monitor, the attested VM id, and a nonce, and the customer 12 will receive the attestation results. The second module that is modified is the nova database module. Specifically, the cloud controller 14 is modified so that it can store the customer's 12 specifications about the security properties required for his VM 42, which is received from nova api. Tables are also added in the database, which record each cloud server's 18 monitoring and attestation capabilities, such as what properties they support for monitoring. The third module that is modified is the nova scheduler. This is modified to implement the policy validation module 20 and deployment module 22 of the cloud controller 14. The policy validation module 20 is responsible for choosing the host for the VM 42 during initial allocation and migration. The default scheduler in OpenStack is to choose the cloud server 18 with the most remaining physical resources, to achieve workload balance. A new filter is added (property_filter) to select qualified cloud servers 18 to host the VM 42 based on the customers' 12 security properties, and his monitoring and attestation requirements. Two new modules are added in the cloud controller 14. First, the nova attest_service module manages the attestation services by connecting nova database (for retrieving security properties), oat api (for issuing attestations and receiving results) and nova response (for triggering the responses). Second, nova response is added to implement the response module 24. The response module 24 is responsible for providing some responses if the attestation fails, as discussed in greater detail above. The disclosure of the present application is not limited by the implementation discussed above and any other suitable means known to those of ordinary skill in the art can be implemented in the current system.

The attestation server 16 and client can be implemented by OpenAttestation. The attestation server 16 can have the following modules: (1) oat database stores information about the cloud servers and measurements; (2) oat appraiser is responsible for triggering attestations and reporting the measurements; (3) oat PrivacyCA provides public-key certificates for the cloud servers 18. Furthermore, oat api is modified to extend the APIs with more parameters, such as security properties and VM id. The oat interpreter module is added to implements the property interpretation module 26 and the property certification module 28 of the attestation server 16. This module can also interpret the security health of the VM and make attestation decisions, based on the information of the cloud server 18 from the nova database and the security measurements from the oat database. The disclosure of the present application is not limited by the implementation discussed above and any other suitable means known to those of ordinary skill in the art can be implemented in the current system.

Regarding the implementation for each cloud server 18, nova compute can be the client side of Open-Stack nova. The oat client module can be modified, which is the client side of OpenAttestation. This module can be modified to receive attestation requests. The TPM emulator can be modified to provide secure storage and crypto functions. Two new modules can be added. First, the Monitor Kernel module can start the security measurements and store the values into the TPM emulator. Second, the Monitor tools module can integrate different software VMI tools, VMM profile tool 54 or other logging or provenance tools, into the cloud server 18 to perform the monitoring and take measurements. The disclosure of the present application is not limited by the implementation discussed above and any other suitable means known to those of ordinary skill in the art can be implemented in the current system.

Testing of the implementation of the system 10 of the present disclosure will now be explained in greater detail. The present disclosure is not limited in any way by the testing means performed. A testbed can include three Dell PowerEdge R210II servers, each with a quad-core 3.30 GHz Intel Xeon processor, 32 GB RAM, and on-board dual Gigabit network adapter with 1 Gbps speed. One server can be selected as the cloud controller 18, equipped with Nova Controller and OpenAttestation Server. The other two servers are implemented as cloud server nodes. There are two performance issues: the overhead of VM launching due to new security requirements, and the overhead of attestation during runtime. Different responses for attestation failure recovery are also evaluated. OpenStack Ceilometer is exploited for timing measurements. In the original OpenStack platform, VM launch involves the following four stages: (1) scheduling—allocate VMs to appropriate servers based on customers' requirements and servers' workloads; (2) networking—allocate the networks for the VMs; (3) block_device mapping—set up block devices for the VMs; and (4) spawning—start the VMs on the selected servers. At the scheduling stage, the cloud controller 14 needs to check oat database to find qualified cloud servers 18 which have the security features that support the customer's 12 desired security properties. A fifth stage, attestation, is added after the spawning stage. The attestation stage will check if the VM has been launched securely.

Figure 9:
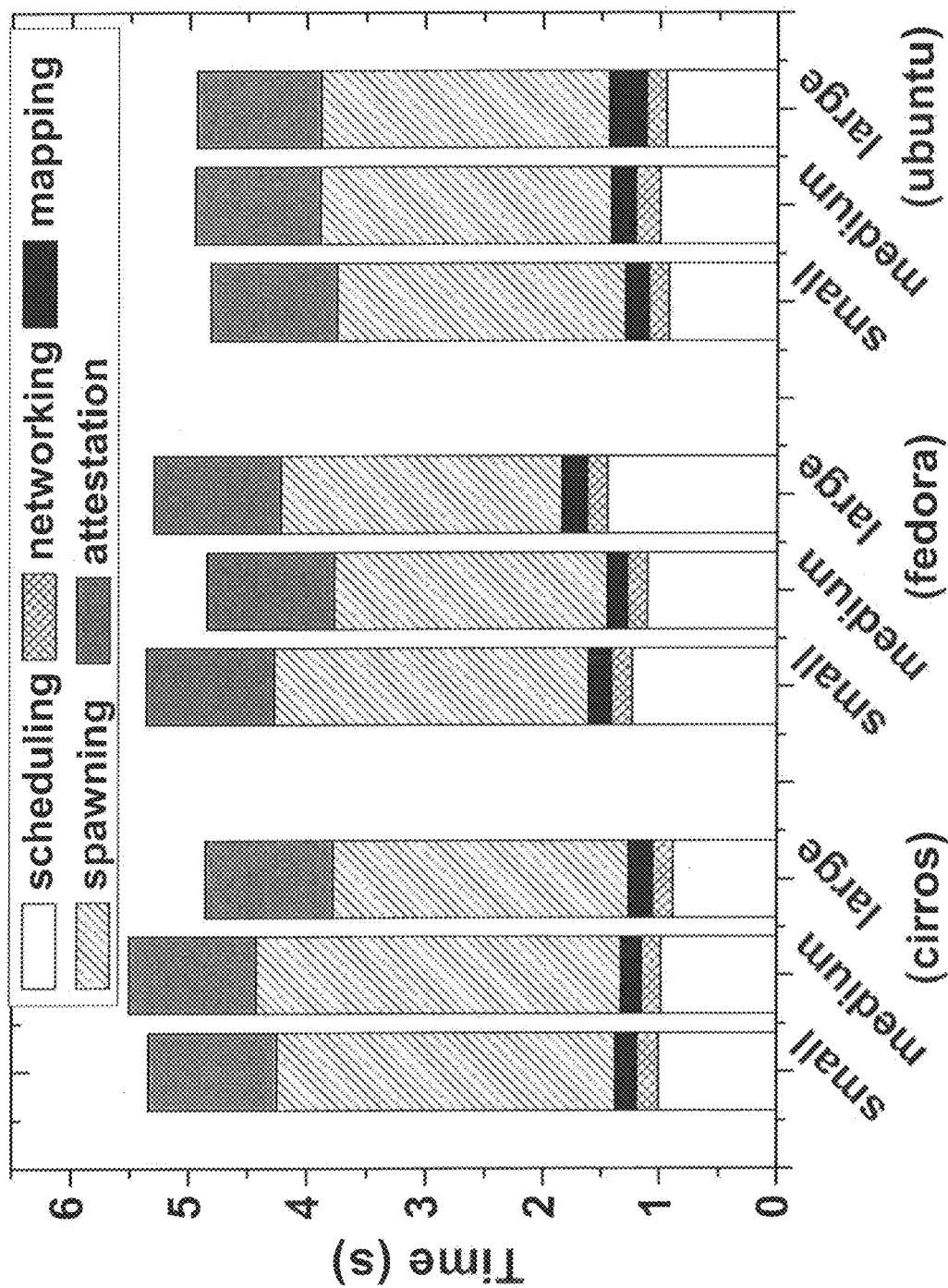
FIG. 9 is a graph showing the performance for VM launching in a test system in accordance with the present disclosure.

FIG. 9 shows the time for each stage of VM launching. Three VM images (cirros, fedora and ubuntu) are tested with three VM flavors (small, medium and large). FIG. 9 shows that the overhead of the attestation stage is about 20%, which is acceptable for VM launching. The main overhead of an attestation is from the message transmitting in the network. During VM runtime, customers 12 can monitor the VM 42 at any time, or periodically at a given frequency or a random frequency. To test the performance effect of periodic runtime attestation, different cloud benchmarks can be run in one virtual machine, while the customer 12 issues the periodic runtime attestation request at different frequencies.

Figure 10:
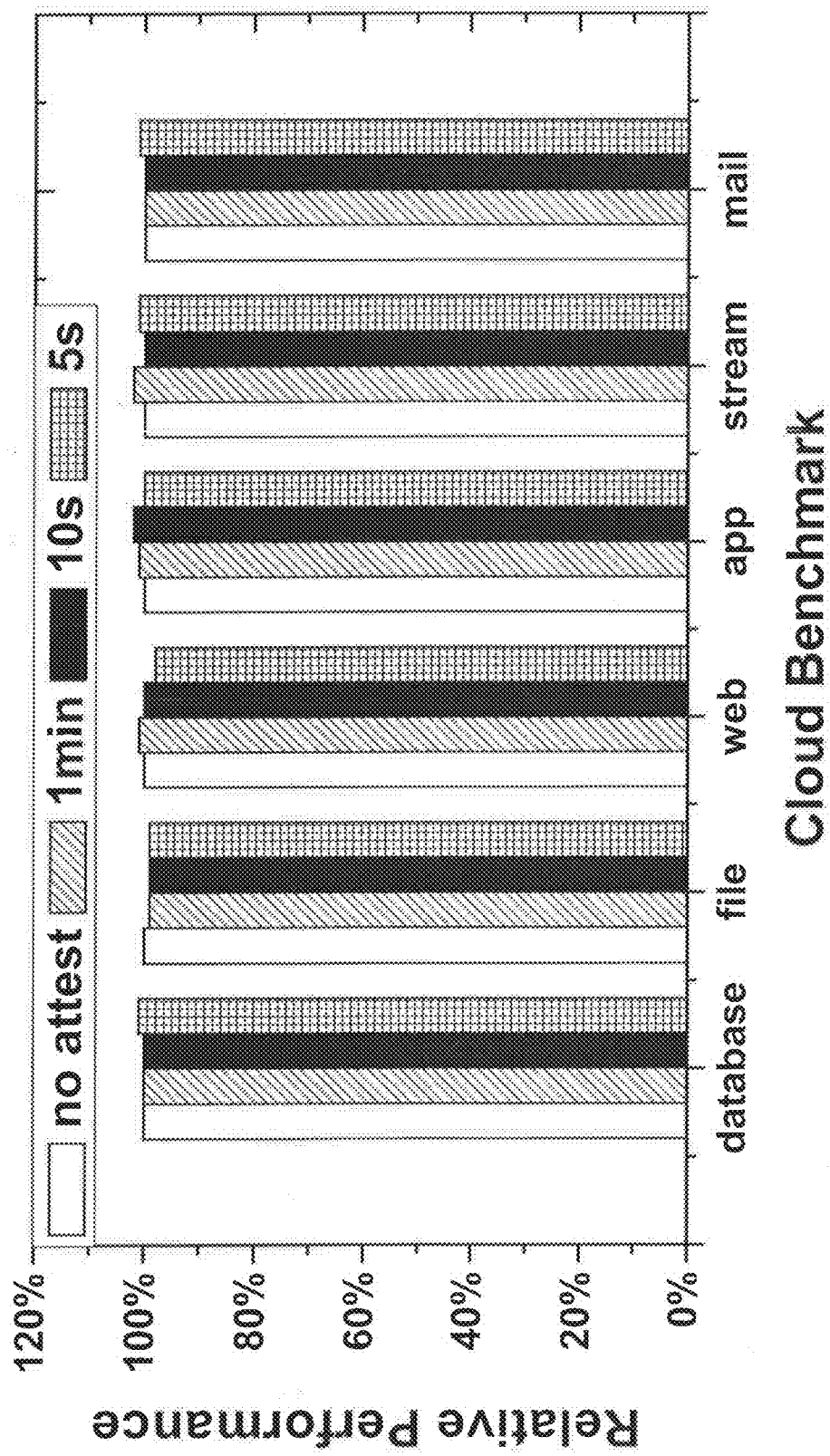
FIG. 10 is a graph showing the performance effect of runtime attestation in a test system in accordance with the present disclosure.

FIG. 10 shows the effect of periodic runtime attestation at a frequency of 1 minute, 10 seconds and 5 seconds, on ubuntu-large VM. FIG. 10 indicates that there is no performance degradation due to the execution of runtime attestation.

FIG. 12 is a similar graph showing the relative CPU usage against the SPEC Benchmarks. This is for CPU-resource monitoring, where the measurements are taken during the VM switch—the VMM profile tool 54 does not intercept the VM's 42 execution. Whether runtime attestation causes performance degradation to the VM execution time depends on the measurement collection mechanism. However, if the periodic attestation frequency is low, then the performance effect is negligible.

Figure 11:
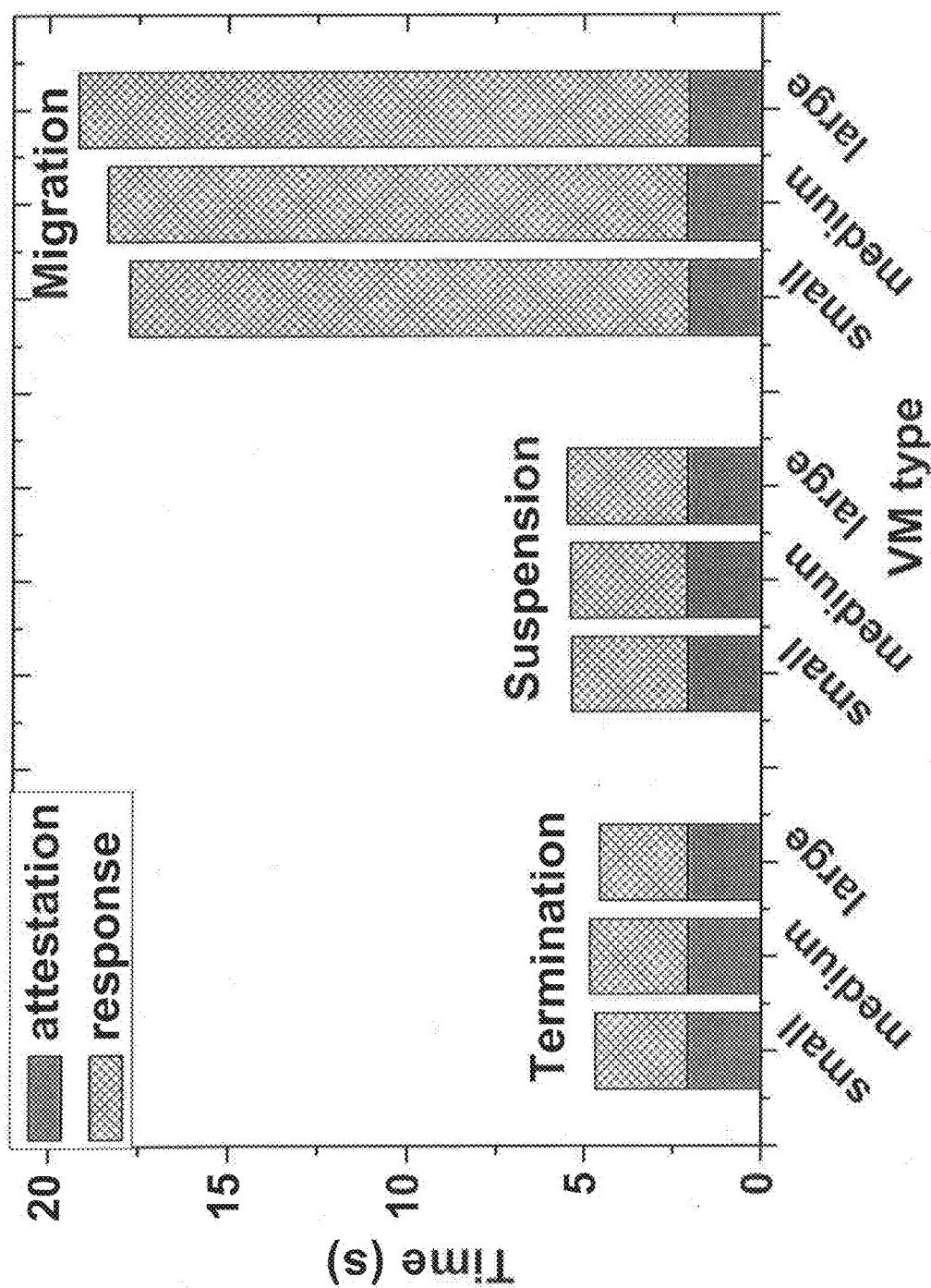
FIG. 11 is a graph showing the attestation time and reaction time for certain response strategies during VM runtime.

The effectiveness of attestation in preventing runtime security breaches depends on two factors: (1) how long it takes to detect potential exploitation of vulnerabilities, which is related to attestation time and mode; and (2) how long it takes to perform the remediation responses. FIG. 11 shows the attestation time and reaction time for each response strategy, providing insights into which strategy should be used. Two factors can influence the choice of a response. First, the reaction time of the response should ideally be less than the "damage time," which is the time from the point at which the attack is detected to the point at which damage results from the attack. In this respect, termination is the fastest while migration is the slowest. Second, the response strategy should also be determined by the specific nature of the attacks and the customers' 12 security needs and usage scenarios. For example, termination sacrifices the VM's availability as the customer 12 cannot use the VM 42 anymore. Suspension enables the customer 12 to continue to use the VM 42 only after the server recovers from security breaches. Migration enables the customer 12 to use the VM 42 immediately after the migration is done. Therefore, migration can be the best for service availability.

In regards to security evaluation, the trusted entities in the attestation architecture include the cloud controller 14 and the attestation server 16. It is preferable that these machines have secure bootup and are secured for runtime protection. Traditional approaches can be taken to protect these servers, such as establishing firewalls, disabling VM launching on these central servers, data hashing and encryption in the database, etc. In addition, the trust module 46 and monitor module 44 in the cloud servers 18 also need to be protected against hardware or hypervisor attacks via existing protection mechanisms known to those of ordinary skill in the art.

The cryptographic protocol described above is verified to ensure the customer 12 can receive unforgeable attestation reports. There are several security properties of the protocol for verification. First, the symmetric keys $K^x$, $K^y$, $K^z$ and the private part of asymmetric keys $SK^{cust}$, $SK^c$, $SK^s$, $ASK^s$ are unknown to the attacker. Second, the security properties P, measurements M, and attestation report R are unknown to the attacker. Third, regarding integrity, the security properties P, measurements M, and attestation report R are not modified by the attacker. Fourth, regarding authentication, the customer 12 and the cloud controller 14 are authenticated and in communication with one another. Fifth, the cloud controller 14 and the attestation server 16 are authenticated and in communication with one another. Finally, the attestation server 16 and the cloud server 18 are authenticated and in communication with another. ProVerif can be used to verify the above security properties. The authentication and communication procedures can be modeled in ProVerif, which can check the secrecy, integrity and authentication properties defined above.

Figure 13:
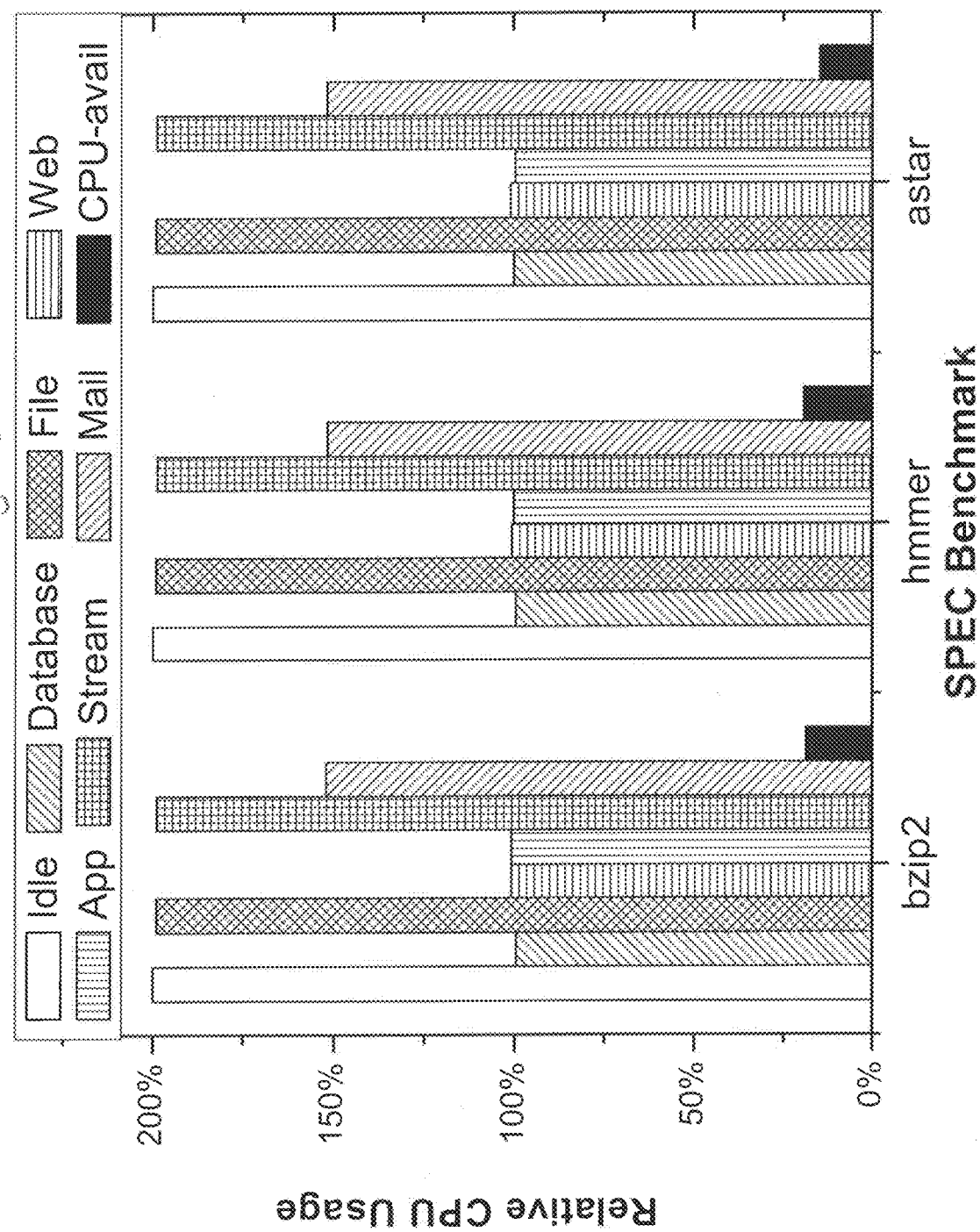
FIG. 13 is a diagram illustrating a remote server of a second embodiment of the system of the present disclosure.
Figure 13:
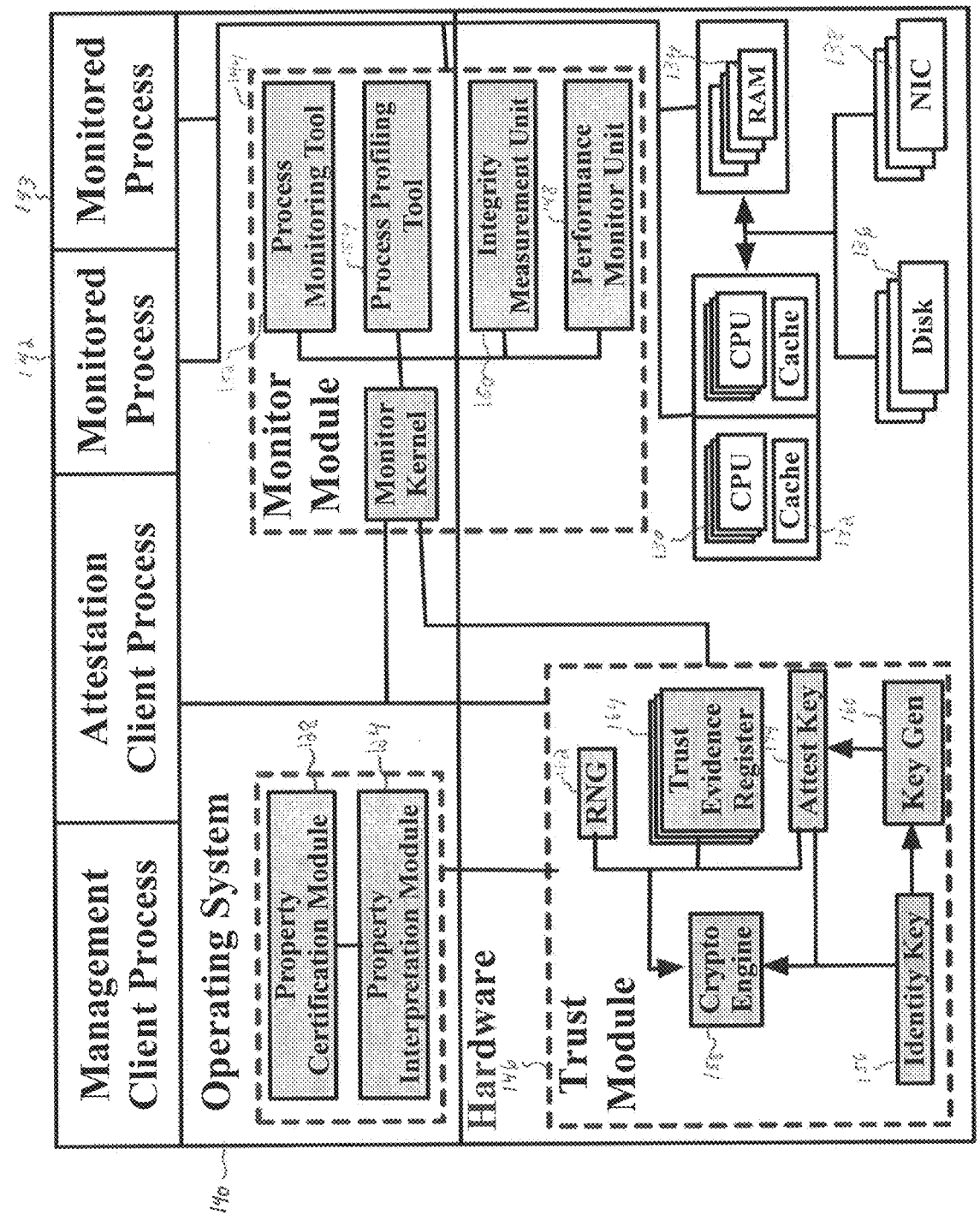

Reference will now be made to FIG. 13, which illustrates an alternative embodiment where a remote server (also called a remote computer system) can be used in the system 10 in lieu of the cloud server 18. In this embodiment, the disclosure of the present application can also be used to monitor and attest software entities in a remote server, which can be a cloud server that is not a virtualized server, as in a PaaS (Platform as a Service) cloud computing system. This means that there can be no hypervisor in the remote server. The software entities to be protected can be processes, rather than virtual machines. The system software managing the software entities can be an operating system, rather than a hypervisor. The monitor module 144 in the server can implement monitoring tools in the OS instead of in the hypervisor 40, or in the hardware. The trust module 146 can still be in the hardware in the remote server. This server enables customers to specify the processes instead of the guest VMs 42 that need protection and security monitoring and attestation. The property interpretation module 124 and property certification module 128 can also be placed in the remote server itself for security property checking, rather than in a separate attestation server 16.

In another embodiment, the remote server need not even be in a cloud computing system. It is just a remote computer system that is accessible to a user.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A system for security health monitoring and attestation of virtual machines in cloud computing systems, comprising:
    a cloud server including a virtual machine, a monitor module and a hypervisor, the cloud server collecting security measurement information and signing and hashing the security measurement information using a cryptography engine; and
    an attestation server for receiving the security measurement information from the cloud server, the attestation server verifying the signature and hash values, and interpreting the security measurement information;
    wherein the attestation server generates an attestation report based on the verification and interpretation of the security measurement information and the monitor module monitors and gathers the security measurement information and collects resource usage measurements for constructing empirical probability distributions.

2. The system of claim 1, wherein the cloud server further comprises a trust module for secure storage of security measurement information, generating keys, and hashing and signing the security measurement information using cryptography operations.

3. The system of claim 2, wherein the monitor module includes a tool located in the hypervisor of the cloud server for detecting and analyzing security vulnerabilities inside the virtual machine.

4. The system of claim 2, wherein the monitor module includes a tool located in the hypervisor of the cloud server for detecting and analyzing security vulnerabilities outside the virtual machine.

5. The system of claim 2, wherein the attestation server gathers security measurement information from at least one of the following: the virtual machine running on the cloud server, a plurality of virtual machines running on the cloud server, and a plurality of virtual machines running on a plurality of cloud servers.

6. The system of claim 5, wherein the attestation server includes a property interpretation module for interpreting the security measurement information to estimate the likelihood of a breach of a security property from at least one of the following: the virtual machine running on the cloud server, a plurality of virtual machines running on the cloud server, a plurality of virtual machines running on a plurality of cloud servers, a plurality of cloud servers, or a data center.

7. The system of claim 6, wherein if the attestation server detects an attack, the cloud controller can either shut down the virtual machine, suspend the virtual machine, or migrate the virtual machine to another cloud server.

8. The system of claim 2, further comprising a plurality of trust evidence registers assessable by only the monitor module and the trust module.

9. The system of claim 1, further comprising a cloud controller for selecting qualified cloud servers for hosting the virtual machine on virtual machine initiation or VM migration.

10. The system of claim 9, wherein the cloud controller, the cloud server, and the attestation server each include at least one long term public-private cryptography key-pair that uniquely identifies the server within the system.

11. The system of claim 10, wherein a new session specific cryptography key pair is created by the trust module whenever an attestation report is needed for the virtual machine.

12. The system of claim 11, wherein the trust module generates accumulated cryptography hashes for each software module that is loaded into the system and wherein the attestation server has knowledge of the pre-calculated hash values of the executable files for the software.

13. A method for security health monitoring and attestation of virtual machines in cloud computing systems, comprising the steps of:
    providing a cloud server including a virtual machine, a monitor module and a hypervisor, the cloud server collecting security measurement information and signing and hashing the security measurement information using a cryptography engine;
    providing an attestation server for receiving the security measurement information from the cloud server, the attestation server verifying the signature and hash values, and interpreting the security measurement information;
    generating an attestation report by the attestation server based on the verification and interpretation of the security measurement information; and
    monitoring and gathering the security measurement information by the monitor module and collecting resource usage measurements by the monitor module for constructing empirical probability distributions.

14. The method of claim 13, further comprising the step of providing a trust module located in the cloud server for securely storing the security measurement information, generating keys, and hashing and signing the security measurement information using cryptography operations.

15. The method of claim 14, further comprising the step of providing a tool in the monitor module located in the hypervisor of the cloud server for detecting and analyzing security vulnerabilities inside the virtual machine.

16. The method of claim 14, further comprising the step of providing a tool in the monitor module located in the hypervisor of the cloud server for detecting and analyzing security vulnerabilities outside the virtual machine.

17. The method of claim 14, further comprising the step of gathering in the attestation server security measurement information from at least one of the following: the virtual machine running on the cloud server, a plurality of virtual machines running on the cloud server, and a plurality of virtual machines running on a plurality of cloud servers.

18. The method of claim 17, further comprising the step of a providing a property interpretation module in the attestation server for interpreting the security measurement information to estimate the likelihood of a breach of a security property from at least one of the following: the virtual machine running on the cloud server, a plurality of virtual machines running on the cloud server, a plurality of virtual machines running on a plurality of cloud servers, a plurality of cloud servers, or a data center.

19. The method of claim 18, further comprising the step of detecting an attack through the attestation server, and if there is an attack, either shutting down the virtual machine, suspending the virtual machine, or migrating the virtual machine to another cloud server.

20. The method of claim 14, further comprising the step of providing a plurality of trust evidence registers assessable by only the monitor module and the trust module.

21. The method of claim 13, further comprising the step of providing a cloud controller for selecting qualified cloud servers for hosting the virtual machine on virtual machine initiation or VM migration.

22. The method of claim 21, further comprising the step of including at least one long term public-private cryptography key-pair that uniquely identifies each of the cloud controller, the cloud server, and the attestation server within the system.

23. The method of claim 22, further comprising the step of creating a new session specific cryptography key pair by the trust module whenever an attestation report is needed for the virtual machine.

24. The method of claim 23, further comprising the step of generating accumulated cryptography hashes by the trust module for each software module that is loaded into the system, the attestation server having knowledge of the pre-calculated hash values of the executable files for the software.

25. A system for security health monitoring and attestation of virtual machines in cloud computing systems, comprising:
a cloud server including a software entity to be protected, a monitor module and a system software that manages the software entity to be protected, the cloud server collecting security measurement information and signing and hashing the security measurement information using a cryptography engine; and
an attestation server for receiving the security measurement information from the cloud server, the attestation server verifying the signature and hash values, and interpreting the security measurement information;
wherein the attestation server generates an attestation report based on the verification and interpretation of the security measurement information and the monitor module monitors and gathers the security measurement information and collects resource usage measurements for constructing empirical probability distributions.

26. The system of claim 25, wherein the cloud server further comprises a trust module for secure storage of security measurement information, generating keys, and hashing and signing the security measurement information using cryptography operations.

27. The system of claim 26, wherein the monitor module includes a tool located in the system software that manages the software entity to be protected of the cloud server for detecting and analyzing security vulnerabilities inside the software entity to be protected.

28. The system of claim 26, wherein the monitor module includes a tool located in the system software that manages the software entity to be protected of the cloud server for detecting and analyzing security vulnerabilities outside the software entity to be protected.

29. The system of claim 26, wherein the attestation server gathers security measurement information from at least one of the following: the software entity to be protected running on the cloud server, a plurality of software entities to be protected running on the cloud server, and a plurality of software entities to be protected running on a plurality of cloud servers.

30. The system of claim 29, wherein the attestation server includes a property interpretation module for interpreting the security measurement information to estimate the likelihood of a breach of a security property from at least one of the following: the software entity to be protected running on the cloud server, a plurality of software entities to be protected running on the cloud server, a plurality of software entities to be protected running on a plurality of cloud servers, a plurality of cloud servers, or a data center.

31. The system of claim 30, wherein if the attestation server detects an attack, the cloud controller can either shut down the software entity to be protected, suspend the software entity to be protected, or migrate the software entity to be protected to another cloud server.

32. The system of claim 26, further comprising a plurality of trust evidence registers assessable by only the monitor module and the trust module.

33. The system of claim 25, further comprising a cloud controller for selecting qualified cloud servers for hosting the software entity to be protected on initiation of the software entity to be protected or on migration of the software entity to be protected.

34. The system of claim 33, wherein the cloud controller, the cloud server, and the attestation server each include at least one long term public-private cryptography key-pair that uniquely identifies the server within the system.

35. The system of claim 34, wherein a new session specific cryptography key pair is created by the trust module whenever an attestation report is needed for the virtual machine.

36. The system of claim 35, wherein the trust module generates accumulated cryptography hashes for each software module that is loaded into the system, and wherein the attestation server has knowledge of the pre-calculated hash values of the executable files for the software.

37. A method for security health monitoring and attestation of virtual machines in cloud computing systems, comprising the steps of:
providing a cloud server including a software entity to be protected, a monitor module and a system software that manages the software entity to be protected, the cloud server collecting security measurement information and signing and hashing the security measurement information using a cryptography engine;
providing an attestation server for receiving the security measurement information from the cloud server, the attestation server verifying the signature and hash values, and interpreting the security measurement information;
generating an attestation report based on the verification and interpretation of the security measurement information; and
monitoring and gathering the security measurement information by the monitor module and collecting resource usage measurements by the monitor module for constructing empirical probability distributions.

38. The method of claim 37, further comprising the steps of providing a trust module for securely storing the security measurement information, generating keys, and hashing and signing the security measurement information using cryptography operations.

39. The method of claim 38, further comprising the step of providing a tool in the monitor module located in the system software that manages the software entity to be protected of the cloud server for detecting and analyzing security vulnerabilities inside the software entity to be protected.

40. The method of claim 38, further comprising the step of providing a tool in the monitor module located in the system software that manages the software entity to be protected of the cloud server for detecting and analyzing security vulnerabilities outside the software entity to be protected.

41. The method of claim 38, further comprising the step of gathering in the attestation server security measurement information from at least one of the following: the software entity to be protected running on the cloud server, a plurality of software entities to be protected running on the cloud server, and a plurality of software entities to be protected running on a plurality of cloud servers.

42. The method of claim 41, further comprising the step of providing a property interpretation module in the attestation server for interpreting the security measurement information to estimate the likelihood of a breach of a security property from at least one of the following: the software entity to be protected running on the cloud server, a plurality of software entities to be protected running on the cloud server, a plurality of software entities to be protected running on a plurality of cloud servers, a plurality of cloud servers, or a data center.

43. The method of claim 42, further comprising the step of detecting an attack through the attestation server, and if there is an attack, either shutting down the software entity to be protected, suspending the software entity to be protected, or migrating the software entity to be protected to another cloud server.

44. The method of claim 38, further comprising the step of providing a plurality of trust evidence registers assessable by only the monitor module and the trust module.

45. The method of claim 37, further comprising the step of providing a cloud controller for selecting qualified cloud servers for hosting the software entity to be protected on initiation of the software entity to be protected or on migration of the software entity to be protected.

46. The method of claim 45, further comprising the step of including at least one long term public-private cryptography key-pair that uniquely identifies each of the cloud controller, the cloud server, and the attestation server within the system.

47. The method of claim 46, further comprising the step of creating a new session specific cryptography key pair created by the trust module whenever an attestation report is needed for the virtual machine.

48. The method of claim 47, further comprising the step of generating accumulated cryptography hashes by the trust module for each software module that is loaded into the system, and wherein the attestation server has knowledge of the pre-calculated hash values of the executable files for the software.

* * * * *